(12) United States Patent
Yamamoto et al.

(10) Patent No.: US 9,219,588 B2
(45) Date of Patent: Dec. 22, 2015

(54) RADIO COMMUNICATION SYSTEM, TERMINAL APPARATUS, AND RADIO COMMUNICATION METHOD IN THE RADIO COMMUNICATION SYSTEM

(75) Inventors: Akihiro Yamamoto, Kawasaki (JP); Takayoshi Ode, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 91 days.

(21) Appl. No.: 13/594,129

(22) Filed: Aug. 24, 2012

(65) Prior Publication Data
US 2012/0320833 A1 Dec. 20, 2012

Related U.S. Application Data

(63) Continuation of application No. PCT/JP2010/001534, filed on Mar. 5, 2010.

(51) Int. Cl.
*H04L 5/00* (2006.01)
*H04J 11/00* (2006.01)
(Continued)

(52) U.S. Cl.
CPC ........... *H04L 5/0053* (2013.01); *H04J 11/0069* (2013.01); *H04L 5/0007* (2013.01); *H04L 27/2655* (2013.01); *H04W 56/00* (2013.01)

(58) Field of Classification Search
CPC .............. H04W 56/00; H04W 56/001; H04W 56/0015; H04W 56/002; H04W 56/0035; H04W 56/0045; H04W 56/0085; H04W 56/005; H04W 24/10; H04W 72/0413; H04W 72/042; H04L 27/2675; H04L 27/2655; H04L 27/2656; H04L 27/2657; H04L 27/2662; H04L 27/2695; H04L 5/0023; H04L 7/0016; H04L 2027/0065; H04L 25/0204; H04L 25/0226; H04L 27/0014; H04L 27/2601; H04L 27/2613; H04L 27/2659; H04B 1/7156; H04B 1/7083; H04B 2001/70724; H04B 2001/70701
USPC ................. 370/328, 329, 350, 344, 443, 503; 455/502, 509; 375/260
See application file for complete search history.

(56) References Cited

U.S. PATENT DOCUMENTS 5,408,504 A * 4/1995 Ostman ........................ 375/354
5,694,388 A 12/1997 Sawahashi
(Continued)

FOREIGN PATENT DOCUMENTS

| CN | 101510867 A | 8/2009 |
|---|---|---|
| CN | 101645868 A | 2/2010 |

(Continued)

OTHER PUBLICATIONS

Nakamura, Takaharu ; Dec. 17-18, 2009; LTE-Advanced (3GPP Release 10 and beyond)—RF aspects—; 3GPP; Slides 8-9.*
(Continued)

*Primary Examiner* — Benjamin H Elliott, IV
*Assistant Examiner* — Eric Nowlin
(74) *Attorney, Agent, or Firm* — Myers Wolin, LLC

(57) ABSTRACT

A radio communication system, including: a base station apparatus; and a terminal apparatus, wherein the base station apparatus and the terminal apparatus transmits to or receives from the terminal apparatus and the base station apparatus respectively a radio signal by using a plurality of frequency bands as a transmission frequency or a reception frequency, the base station apparatus includes a transmission unit which transmits a synchronization signal or a reference signal in each frequency band of the plurality of frequency bands, and the terminal apparatus includes a synchronization control unit which selects at least one synchronization signal or reference signal from the plurality of synchronization signals or reference signals transmitted from the base station apparatus and performs synchronization control based on the selected synchronization signal or reference signal.

18 Claims, 34 Drawing Sheets

(51) Int. Cl.
*H04L 27/26* (2006.01)
*H04W 56/00* (2009.01)

(56) References Cited

U.S. PATENT DOCUMENTS

| | | | | |
|---|---|---|---|---|
| 5,936,961 | A * | 8/1999 | Chiodini et al. | 370/441 |
| 6,226,337 | B1 * | 5/2001 | Klank et al. | 375/367 |
| 7,430,193 | B2 * | 9/2008 | Kim et al. | 370/338 |
| 7,627,068 | B2 * | 12/2009 | Sun et al. | 375/362 |
| 8,064,833 | B2 * | 11/2011 | Tandai et al. | 455/45 |
| 8,144,819 | B2 * | 3/2012 | Baldemair et al. | 375/343 |
| 8,165,547 | B2 * | 4/2012 | Hong et al. | 455/208 |
| 8,184,573 | B2 * | 5/2012 | Higuchi et al. | 370/324 |
| 8,223,742 | B2 * | 7/2012 | Sugawara et al. | 370/350 |
| 8,300,725 | B2 * | 10/2012 | Kishigami et al. | 375/295 |
| 8,428,016 | B2 * | 4/2013 | Bhattad et al. | 370/329 |
| 8,509,267 | B2 * | 8/2013 | Kim et al. | 370/503 |
| 8,520,660 | B2 * | 8/2013 | Dai et al. | 370/350 |
| 8,605,801 | B2 * | 12/2013 | Rezaiifar et al. | 375/260 |
| 8,737,352 | B2 * | 5/2014 | Kawagishi et al. | 370/331 |
| 2004/0258014 | A1 * | 12/2004 | Ro | H04L 5/0048 370/328 |
| 2006/0114812 | A1 | 6/2006 | Kim | |
| 2007/0202902 | A1 * | 8/2007 | Jansen et al. | 455/502 |
| 2008/0287066 | A1 | 11/2008 | Tandai et al. | |
| 2009/0080500 | A1 * | 3/2009 | Muharemovic | H04J 13/0062 375/146 |
| 2009/0135802 | A1 | 5/2009 | Haga et al. | |
| 2009/0185541 | A1 | 7/2009 | Tanno et al. | |
| 2010/0167660 | A1 * | 7/2010 | Asanuma | 455/67.13 |
| 2011/0261716 | A1 * | 10/2011 | Kim | H04B 7/0671 370/252 |
| 2013/0039319 | A1 * | 2/2013 | Shi | H04L 5/0023 370/329 |
| 2013/0230018 | A1 * | 9/2013 | Yagi | H04L 5/0048 370/330 |

FOREIGN PATENT DOCUMENTS

| | | |
|---|---|---|
| JP | 2855170 B2 | 11/1998 |
| JP | 11-234159 A | 8/1999 |
| JP | 2003-101499 A | 4/2003 |
| JP | 2006-507753 A | 3/2006 |
| JP | 2006-527965 A | 12/2006 |
| JP | 2007-36499 A | 2/2007 |
| JP | 2007-525929 A | 9/2007 |
| JP | 2007-336499 | 12/2007 |
| JP | 2008-124832 A | 5/2008 |
| JP | 2009-164815 A | 7/2009 |
| WO | 2004/112292 A1 | 12/2004 |
| WO | 2005/086398 A1 | 9/2005 |
| WO | 2007/023810 A1 | 3/2007 |
| WO | 2009/082173 A2 | 7/2009 |

OTHER PUBLICATIONS

3GPP; "Physical Channels and Modulation",,3GPP TS36.211 V8.8.0; 3rd Generation Partnership Project; Technical Specification Group Radio Access Network; Evolved Universal Terrestrial Radio Access (E-UTRA); "Physical Channels and Modulation"; (Release 8); Sep. 2009.

3GPP; "User Equipment (UE) procedures in idle mode",,3GPP TS36.304 V8.7.0; 3rd Generation Partnership Project; Technical Specification Group Radio Access Network; Evolved Universal Terrestrial Radio Access (E-UTRA); "User Equipment (UE) procedures in idle mode"; (Release 8); Sep. 2009.

International Search Report,Hiroshi Sasaki,International Search Report issued for corresponding International Patent Application No. PCT/JP2010/001534, mailed Apr. 6, 2010. English translation.

Notification of Reason for Rejection issued for corresponding Japanese Patent Application No. 2012-502887, dispatched Aug. 6, 2013 with English translation.

Decision of Rejection issued for corresponding Japanese Patent Application No. 2012-502887, dispatched on Mar. 25, 2014, with an English translation.

First Notification of Office Action issued for corresponding Chinese Patent Application No. 201080065167.6 dated Sep. 2, 2014, with an English translation.

Notice of Pretrial Reexamination Release and Reconsideration Report issued for corresponding Japanese Patent Application No. 2012-502887 dispatched on Aug. 26, 2014 with an English translation.

Notice of Reasons for Refusal issued for corresponding Japanese Patent Application No. 2012-502887 dispatched on Apr. 21, 2015 with a partial English translation.

* cited by examiner

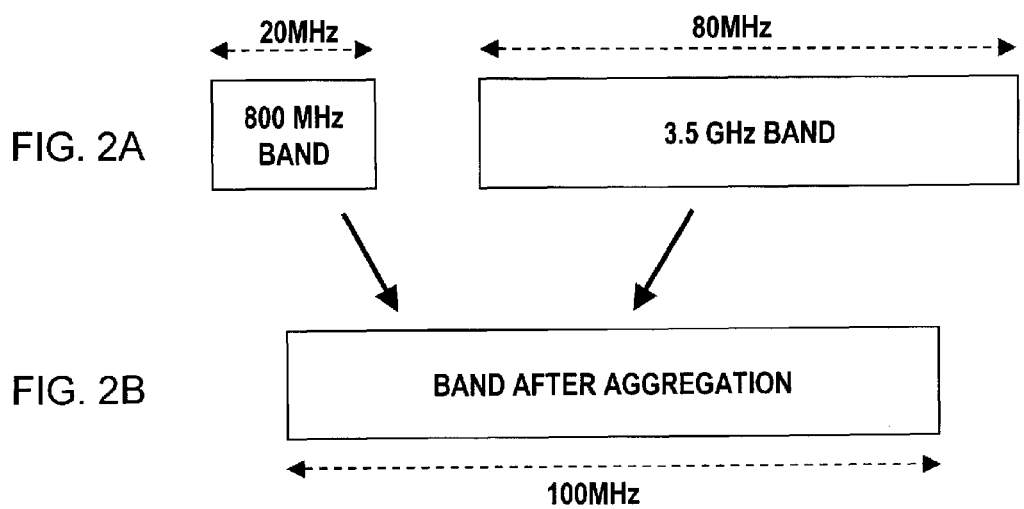
FIG. 2A
FIG. 2B
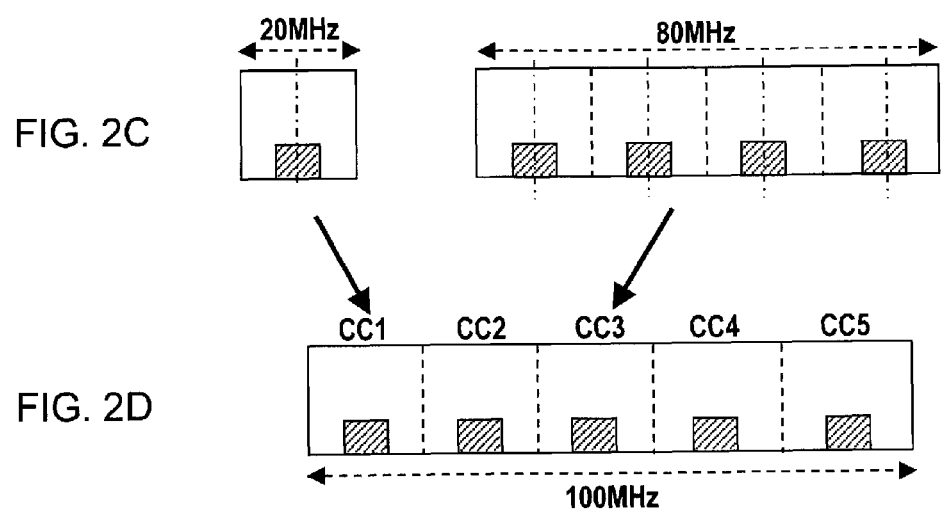
FIG. 2C
FIG. 2D

FIG. 4

| slot=0 sub frame=0 SCH | slot=1 sub frame=0 PBCH | slot=2 sub frame=1 DATA | slot=3 sub frame=1 DATA | slot=4 sub frame=2 DATA | slot=5 sub frame=2 DATA | slot=6 sub frame=3 DATA | slot=7 sub frame=3 DATA | slot=8 sub frame=4 DATA | slot=9 sub frame=4 DATA | slot=10 sub frame=5 SCH | slot=11 sub frame=5 PBCH | slot=12 sub frame=6 DATA | slot=13 sub frame=6 DATA | slot=14 sub frame=7 DATA | slot=15 sub frame=7 DATA | slot=16 sub frame=8 DATA | slot=17 sub frame=8 DATA | slot=18 sub frame=9 DATA | slot=19 sub frame=9 DATA |

RADIO COMMUNICATION SYSTEM, TERMINAL APPARATUS, AND RADIO COMMUNICATION METHOD IN THE RADIO COMMUNICATION SYSTEM

CROSS-REFERENCE TO RELATED APPLICATION

This application is a continuation application of International Application PCT/JP2010/1534 filed on Mar. 5, 2010 and designated the U.S., the entire contents of which are incorporated herein by reference.

FIELD

The embodiments discussed herein are related to a radio communication system, a terminal apparatus, and a radio communication method in the radio communication system.

BACKGROUND

A radio communication system based on LTE-Advanced (Long Term Evolution Advanced) for the 3GPP is presently being discussed. The possibility of expanding the transmission or reception frequency band of transmitted and received radio signals in the radio communication system based on LTE-Advanced by comparison with that in the LTE radio communication system is being discussed.

There is an aggregation as a technique for realizing such broadband transmission. For example, the aggregation involves aggregating a plurality of 20 MHz bands from among different frequency bands (800 MHz band, 3.5 GHz band, and the like) to obtain a bandwidth of 100 MHz, or aggregating a plurality of 20 MHz bands from the same frequency band to obtain a bandwidth of 100 MHz. For example, by transmitting data or the like by using the 100 MHz bandwidth, a base station apparatus can expand the bandwidth and realize faster transmission than in the case where the 20 MHz bandwidth is used.

On the other hand, how to handle a synchronization signal in the base station apparatus and a terminal apparatus in the case of realizing the broadband transmission by aggregation in the 3GPP is also being presently discussed. However, in a LTE-based radio communication system, the synchronization signal with a different sequence for each cell may be used.

Other conventional techniques relating to radio communication systems are described below, for example. Thus, the aggregation number of control channel elements in a downlink subframe corresponding to the ACK/NACK signal can be expanded over that of another downlink subframe.

In another technique, a AFC feedback control is performed based on the detected frequency error, a clock signal is generated with reference to the frequency of a reference signal, and the generated clock signal is supplied to an A/D conversion means, thereby shortening the lead-in time of frequency correction (synchronization).

Patent Document 1: Japanese Laid-open Patent Publication No. 2009-164815
Patent Document 2: Japanese Laid-open Patent Publication No. H11-234159
Non-Patent Document 1: 3GPPTS 36.211V8.8.0 (for example, 6.10.1.1, 6.11.1.1, 6.11.2.1)
Non-Patent Document 2: 3GPPTS 36.304V8.7.0 (for example, 5.2.3)

However, the aforementioned patent documents do not disclose the processing of the synchronization signal in the case where a plurality of bands is aggregated to perform broadband transmission.

Meanwhile, when broadband transmission is realized, the frequency accuracy or phase accuracy of the terminal apparatus can be degraded depending on the band in which the synchronization signal is used because a plurality of bands is aggregated to obtain a broad band.

SUMMARY

According to an aspect of the embodiments, a radio communication system, including: a base station apparatus; and a terminal apparatus, wherein the base station apparatus and the terminal apparatus transmits to or receives from the terminal apparatus and the base station apparatus respectively a radio signal by using a plurality of frequency bands as a transmission frequency or a reception frequency, the base station apparatus includes a transmission unit which transmits a synchronization signal or a reference signal in each frequency band of the plurality of frequency bands, and the terminal apparatus includes a synchronization control unit which selects at least one synchronization signal or reference signal from the plurality of synchronization signals or reference signals transmitted from the base station apparatus and performs synchronization control based on the selected synchronization signal or reference signal.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2A to FIG. 2D illustrate examples of applications.
FIG. 4 illustrates a configuration example of a radio frame.

DESCRIPTION OF EMBODIMENTS

Figure 1:
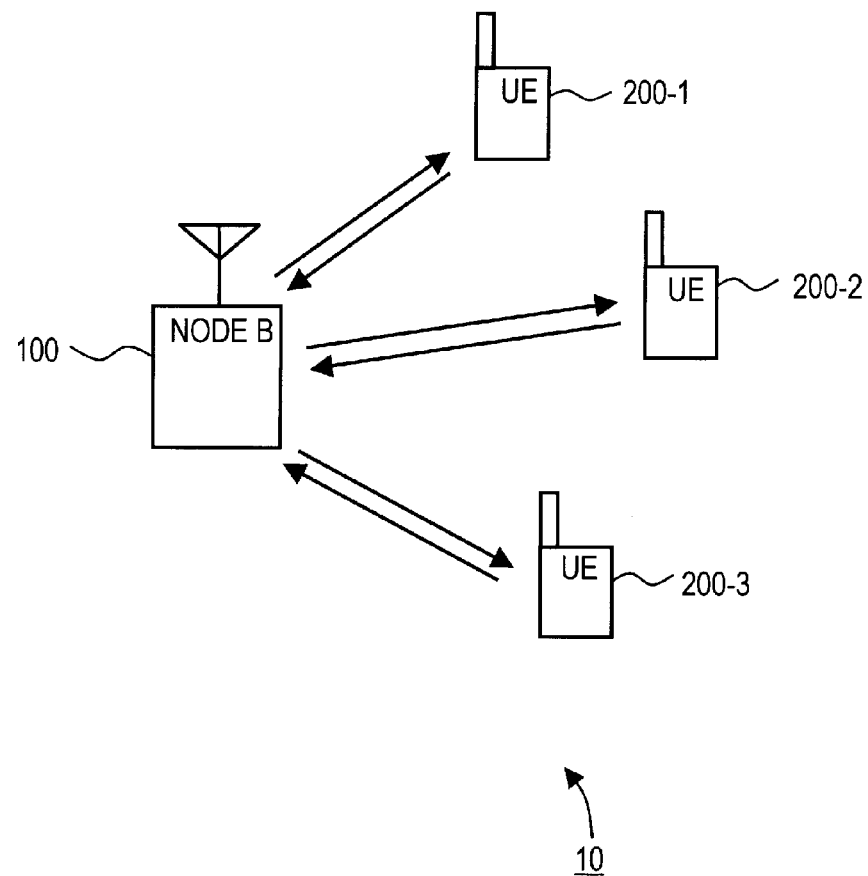
FIG. 1 illustrates a configuration example of a radio communication system.

The best mode for carrying out the present invention will be explained below. FIG. 1 illustrates a configuration example of a radio communication system 10.

The radio communication system 10 includes a base station apparatus (Node B, referred to hereinbelow as "base station") 100 and terminal apparatuses (UEs (User Equipments); referred to hereinbelow as "terminals") 200-1 to 200-3.

The base station 100 can perform radio communication with the terminal apparatuses 200-1 to 200-3 in a radio communicable range. For example, the base station 100 can transmit data or the like to the terminals 200-1 to 200-3 (downlink direction), and the terminals 200-1 to 200-3 can also transmit data or the like to the base station 100 (uplink direction). FIG. 1 illustrates an example in which three terminals 200-1 to 200-3 are represented, but one terminal or a plurality of terminals may be also used. Further, since the terminals 200-1 to 200-3 have the same configuration, the explanation below will relate to the terminal 200, unless specifically stated otherwise.

In the present embodiment, the base station 100 and the terminal 200 perform radio communication by aggregating a plurality of frequency bands with respect to a transmission or reception frequency of a radio signal which is transmitted or received and by causing a bad width to the broad band. As a result, the base station 100 and the terminal 200 can transmit and receive data or the like in a larger volume and at a higher speed than in the case where data or the like is transmitted and received in individual band without aggregating the band. For example, the aggregation is to cause frequency band to the broad band by aggregating a plurality of communication bands as above mentioned.

An example of aggregation will be described below. FIG. 2(A) and FIG. 2(B) illustrate an example in which a bandwidth of "100 MHz" is obtained by using a "20 MHz" band from a frequency band of a "800 MHz band" and a "80 MHz" band from a frequency band of a "3.5 GHz" band. In addition to the above, it can also obtain a "100 MHz" band by the aggregation by combining a plurality of bands from among the frequency bands of a "3.5 GHz band". Furthermore, another frequency band such as a "2.5 GHz band" may be also used. And, the aggregated bandwidth may be "80 MHz", "40 MHz", or the like. Furthermore, the bandwidth prior to the aggregation may be "1 MHz" or "0.8 MHz", rather than "20 MHz".

FIG. 2(C) and FIG. 2(D) illustrate an example in which a synchronization channel is arranged for each "20 MHz" bandwidth. In the above-described LTE-Advanced system, for example, some terminal 200 is a terminal with a usage bandwidth of "20 MHz" (for example, terminal conforming to the LTE system) and some is a terminal with a usage bandwidth of "100 MHz" (for example, terminal conforming to the LTE-Advanced system). In the present embodiment, it is assumed that the base station 100 transmits to the terminal 200 the synchronization signal and reference signal differing for each "20 MHz" bandwidth, since the base station 100 receives or transmits data or the like from or to either of the terminals 200. The terminal 200 with usage bandwidth of "200 MHz" performs a synchronization processing by using the synchronization signal and reference signal in any "20 MHz" if using any "20 MHz" of a plurality of "20 MHz".

In the present embodiment, the "20 MHz" frequency bandwidth is referred to as a "CC" (Component Carrier). The CC may be used "1 MHz" or the like other than "20 MHz". For example, the frequency of the synchronization signal and reference signal in each CC is assumed to coincide with the central frequency indicated by a dot-dash line as illustrated in FIG. 2(C). As a result, different synchronization signal and reference signal can be taken for each CC.

For example, when a CC1 belongs to a frequency band "800 MHz band" and a CC5 belongs to a frequency band "3.5 GHz band", the frequency of the synchronization signal of CC1 becomes different from the frequency of the synchronization signal of CC5. Further, even when the CC1 and CC5 belong to the same frequency band "3.5 GHz band", the frequencies of synchronization signals of CC1 and CC5 will differ from each other. The frequency of the reference signal is likewise different for each CC. However, when a signal sequence of synchronization signal and reference signal is different for each CC, for example, it is easy to identify the CC to which the synchronization signal and reference signal belong in the terminal 200.

The signal sequence of synchronization signal and reference signal may be different for each CC or may be the same for all of the CC. The synchronization signal and reference signal are different signals for each CC, since the central frequency is different for each CC for example even if the sequence is different or same for each CC, and the base station 100 and the terminal 200 can perform the synchronization processing for each CC units.

Figure 3:
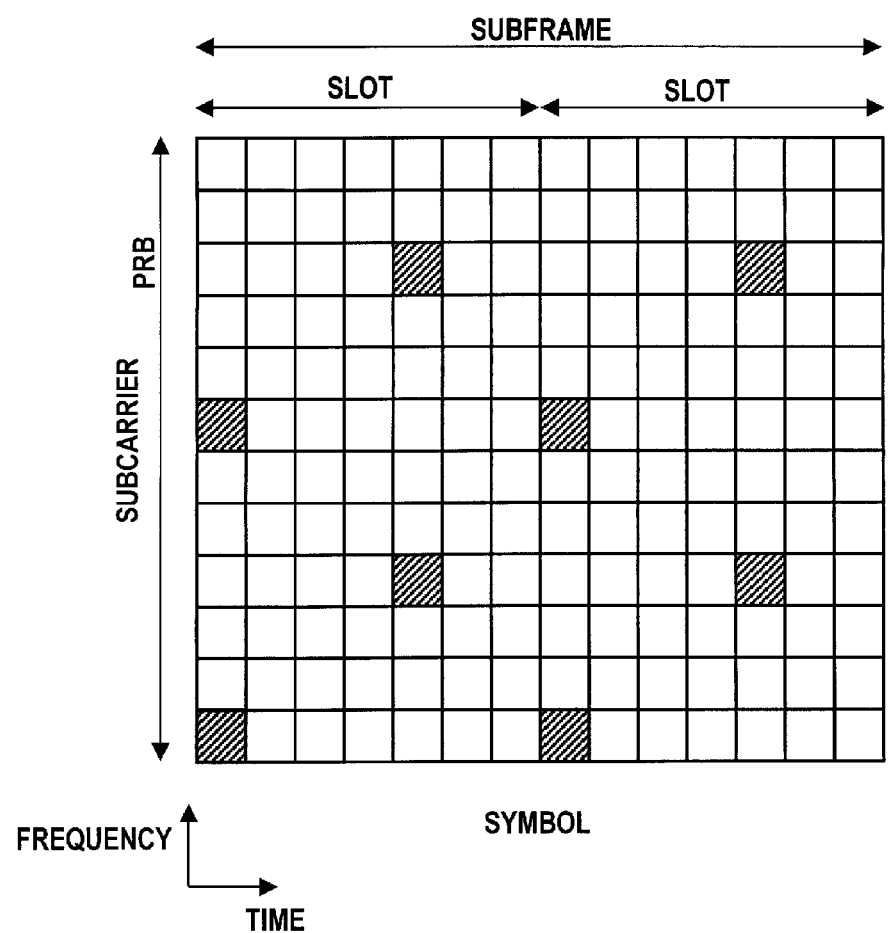
FIG. 3 illustrates a configuration example of a subframe.

The relationship between a radio frame and the synchronization and reference signals will be described below. FIG. 3 illustrates a configuration example of a subframe in the downlink. In FIG. 3, the horizontal axis is a time region, and the vertical axis indicates a frequency region. In the time region, the minimum unit is an OFDM symbol, one slot includes seven OFDM symbols, and one subframe includes two slots. Furthermore, one radio frame includes 10 subframes. In the frequency region, the minimum unit is a subcarrier, one physical resource block (PRB) includes 12 subcarriers, and a band such as "20 MHz" includes several predetermined physical resource blocks. A unit constituted by one OFDM symbol and one subcarrier is called a resource element.

The base station 100 uses resource elements illustrated by hatching in FIG. 3 and transmits the reference signal to the terminal 200. For example, since the reference signal is transmitted by a predetermined resource element, the terminal 200 can receive the reference signal by using the resource.

FIG. 4 illustrates a configuration example of a radio frame. As illustrated in FIG. 4, one radio frame includes 20 slots and 10 subframes, and a synchronization channel (SCH) is transmitted by the subframes of the slot number "0" and "10".

Figure 5:
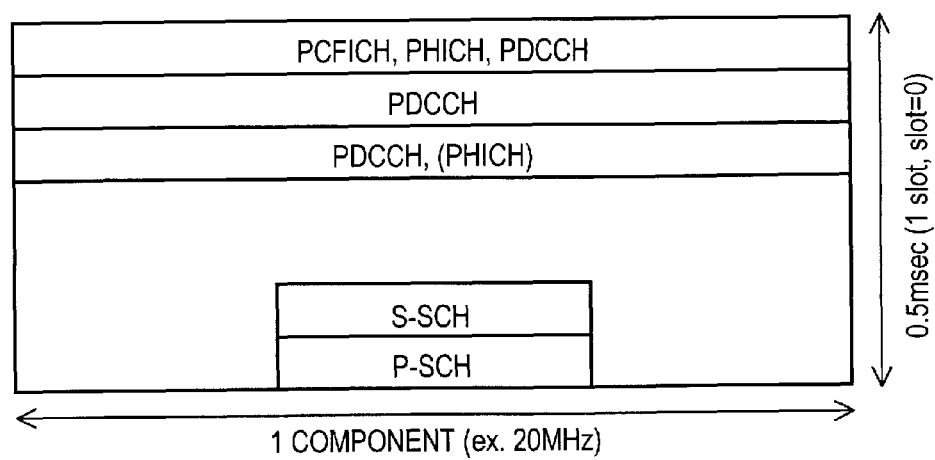
FIG. 5 illustrates a configuration example of a radio slot.

FIG. 5 illustrates a configuration example of the radio slot including a synchronization channel. In FIG. 5, the horizontal axis indicates the time region, and the vertical axis indicates the frequency region respectively, the example of the radio slot of slot number "0" is represented. As illustrated in FIG. 5, the base station 100 transmits, for example, the synchronization channel by using a P-SCH (Primary SCH) and a S-SCH (Secondary SCH) located on predetermined resources.

On the other hand, since the terminal 200 can identify a first slot of the radio frame by reception in the synchronization channel, the terminal 200 can synchronize for example by slot unit or subframe unit by using the synchronization signal. Furthermore, since the reference signal is transmitted in OFDM symbol unit (for example, FIG. 3), the terminal 200 can synchronize in OFDM symbol unit which is smaller than the synchronization signal, by using the reference signal.

In the present embodiment, the base station 100 and the terminal 200 cause the band to the broadband by aggregating a plurality of frequency bands and perform data transmission or the like by broadband after performing the synchronization processing. Such broadband transmission is performed, for example, in the following cases. Thus, there is a case where the terminal 200 is connected to the base station 100 by cell search and a case where the usage band is varied by scheduling.

In the cell search, the terminal 200 selects a cell of connection destination, and performs broadband transmission from an initial stage of connection with the base station 100 containing the selected cell.

On the other hand, for example, the case where the usage bandwidth is varied is a case where the terminal 200 is connected to a certain base station 100 by using the usage bandwidth of "20 MHz" and the usage bandwidth is expanded by scheduling to obtain "100 MHz".

The case where the cell search is performed and the case where the variable band operation is performed will be explained below separately to facilitate the explanation.

<Sell Search>

Figure 6:
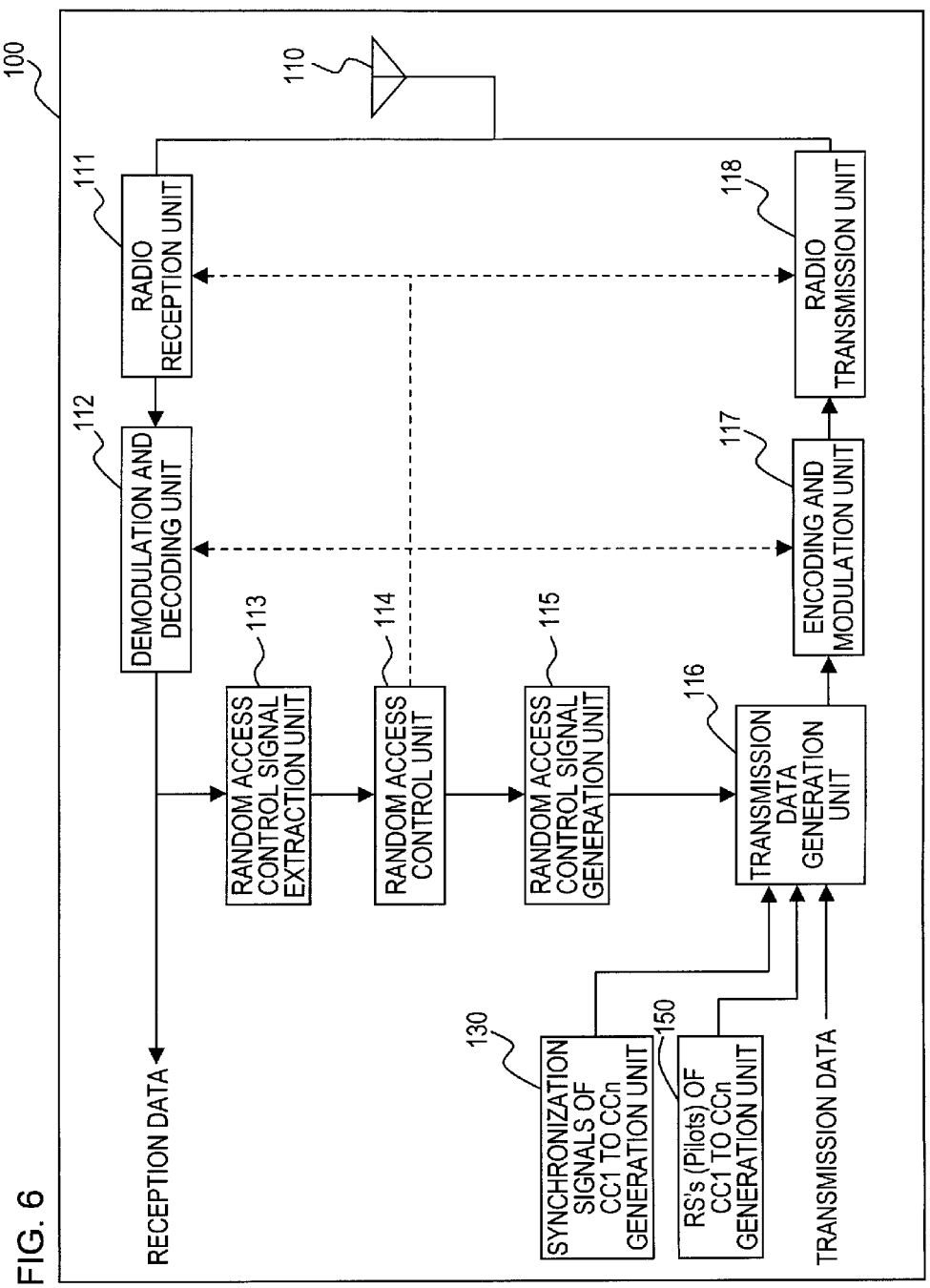
FIG. 6 illustrates a configuration example of a base station.
Figure 7:
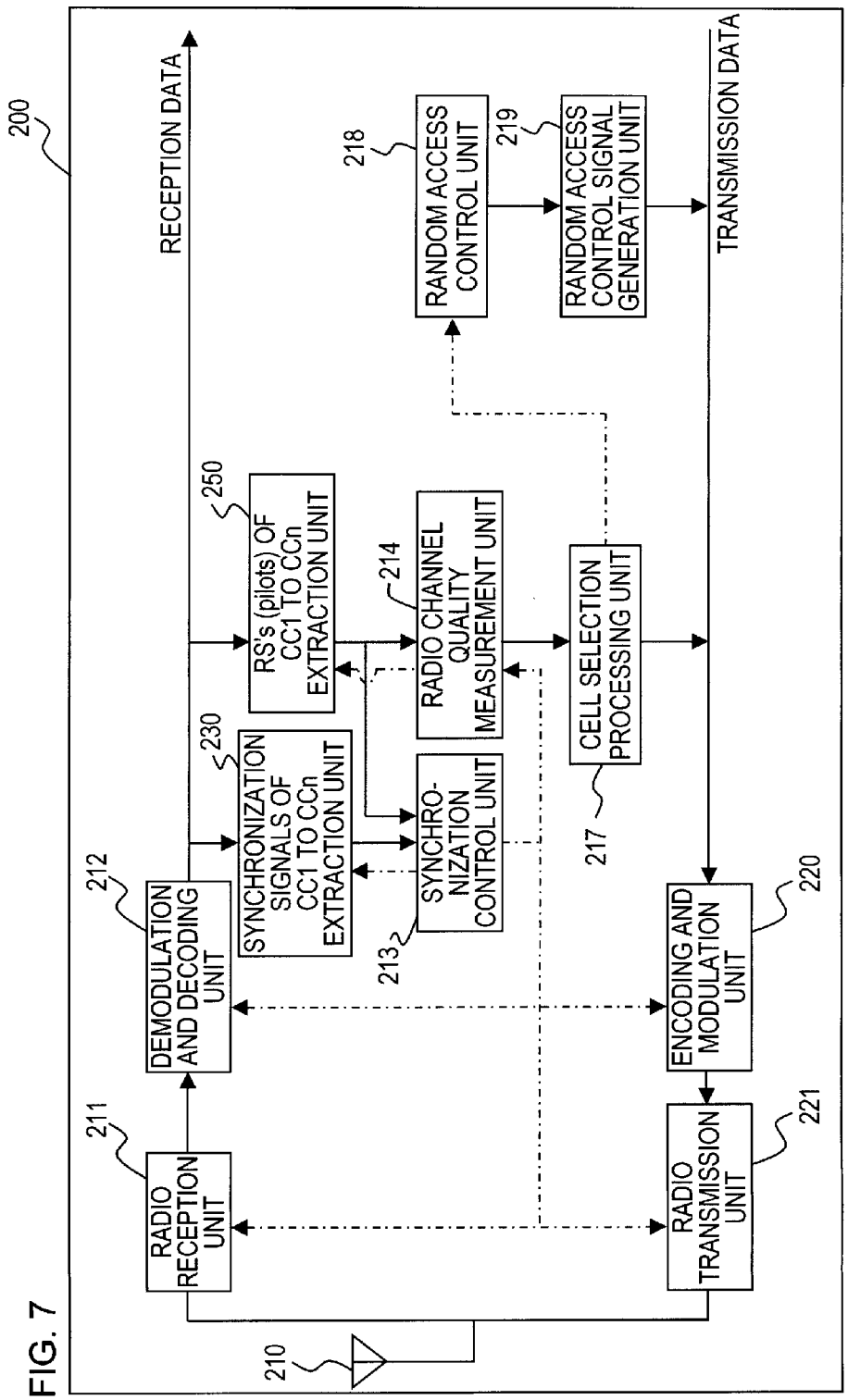
FIG. 7 illustrates a configuration example of a terminal.

Firstly, a configuration example of the base station 100 and the terminal 200 in the case where the cell search is performed will be explained. FIG. 6 illustrates a configuration example of the base station 100, and FIG. 7 illustrates a configuration example of the terminal 200. The terminals 200 have the same configuration, and some terminal 200 is illustrated by FIG. 7.

The base station 100 includes an antenna 110, a radio reception unit 111, a demodulation and decoding unit 112, a random access control signal extraction unit 113, a random access control unit 114, a random access control signal generation unit 115, a transmission data generation unit 116, an encoding and modulation unit 117, a radio transmission unit 118, a synchronization signals of CC1 to CCn (n is natural number equal to or greater than 2) generation unit 130, and a RSs (or pilot signals) of CC1 to CCn generation unit 150.

The antenna 110 receives a radio signal transmitted by the terminal 200, transmits to the radio reception unit 111, and transmits the radio signal outputted from the radio transmission unit 118 to the terminal 200.

The radio reception unit 111, for example, amplifies the radio signal, converts the amplified signal into a signal of a medium frequency band, and extracts a signal sequence such as a data channel and a control channel by performing demapping or the like based on resource allocation information from the random access control unit 114. The radio reception unit 11 outputs the signal sequence to the demodulation and demodulation unit 112.

The demodulation and decoding unit 112 performs demodulation by a predetermined demodulation scheme and decoding at a predetermined encoding ratio based on an instruction from the random access control unit 114 with respect to the signal sequence outputted from the radio reception unit 111. The demodulation scheme is, for example, QPSK (Quadrature Phase Shift Keying) or 16QAM (Quadrature Amplitude Modulation), and the encoding ratio is 1/2, 2/3, or the like.

The random access control signal extraction unit 113 extracts a random access control signal from the output of the demodulation and decoding unit 112. The random access control signal is, for example, the control signal transmitted or received when a random access procedure is executed with the terminal 200. The random access procedure is, for example, performed for timing synchronization and transmission power adjustment when the terminal 200 and the base station 100 are initially connected.

The random access control unit 114 controls the execution of the random access procedure based on the random access control signal outputted from the random access control signal extraction unit 113. Further, the random access control unit 114 instructs the random access control signal generation unit 115 to generate the random access control signal that will be transmitted by the base station 100. In addition, for example, the random access control unit 114 indicates the modulation scheme and encoding ratio to the demodulation and decoding unit 112 and the encoding and modulation unit 117 and outputs resource allocation information to the radio reception unit 111 and the radio transmission unit 118.

The random access control signal generation unit 115 generates the random access control signal based on the instruction from the random access control unit 114 and outputs the generated random access control signal to the transmission data generation unit 116.

The synchronization signals of CC1 to CCn generation unit 130 generates different synchronization signals for each CC1 to CCn and outputs each synchronization signals to the transmission data generation unit 116. The synchronization signal is generated for each CC, as mentioned hereinabove, but the signal sequence may be same or different.

The RSs of CC1 to CCn generation unit 150 generates different reference signals (or pilot signals or known signals) for each CC1 to CCn, and outputs the reference signals to the transmission data generation unit 116. Similarly to the synchronization signal, the reference signal is generated for each CC, and the signal sequence may be same or different for each CC.

The transmission data generation unit 116 outputs the random access control signal, synchronization signals of CC1 to CCn, reference signals of CC1 to CCn, and transmission data.

The encoding and modulation unit 117 performs encoding at the predetermined encoding ratio and modulation by the predetermined modulation scheme based on the instruction from the random access control unit 114 with respect to the transmission data and the like outputted from the transmission data generation unit 116.

The radio transmission unit 118 maps the transmission data and the like in the predetermined resource, for example, based on the resource allocation information from the random access control unit 114, with respect to the output of the encoding and modulation unit 117, generates the radio signal, e.g. by conversion to a high-frequency signal, and outputs the generated radio signal to the antenna 110.

As illustrated in FIG. 7, the terminal 200 is provided with an antenna 210, a radio reception unit 211, a demodulation and decoding unit 212, a synchronization control unit 213, a radio channel quality measurement unit 214, a cell selection and processing unit 217, a random access control unit 218, a random access control signal generation unit 219, a synchronization signals of CC1 to CCn extraction unit 230, and a RSs of CC1 to CCn extraction unit 250.

The antenna 210 receives the radio signal transmitted from the base station 100, outputs the received signal to the radio reception unit 211, and transmits the radio signal outputted from the radio transmission unit 221 to the base station 100.

The radio reception unit 211, for example, amplifies the radio signal, converts the amplified signal into a signal of an intermediate frequency band, performs demapping or the like based on the resource allocation information or the like with respect to the synchronization signal, reference signal, data and the like allocated on the resource, and extracts a signal sequence of data channel or control channel. For example, the radio reception unit 211 holds the resource allocation information transmitted from the base station 100 and extracts the synchronization signal, reference signal, and the like based on the this information.

The demodulation and decoding unit 212 performs demodulation and demodulation by the predetermined demodulation scheme and at the predetermined encoding ratio with respect to the signal sequence outputted from the radio reception unit 211. For example, the demodulation and decoding unit 212 performs demodulation and decoding based on the demodulation scheme and encoding ratio indicated by the downlink control signal transmitted from the base station 100.

The synchronization signals of CC1 to CCn extraction unit 230 extracts synchronization signals of CC1 to CCn from the output of the demodulation and decoding unit 212 and outputs the extracted synchronization signals to the synchronization control unit 213.

The synchronization control unit 213 selects at least one optimum synchronization signal from among the synchronization signals that differ for each CC and are outputted from the synchronization signals of CC1 to CCn extraction unit 230. Further, the synchronization control unit 213 selects at least one optimum reference signal from among the reference signals that differ for each CC and are outputted from the RSs of CC1 to CCn extraction unit 250. The selection is described hereinbelow. The synchronization control unit 213 synchronizes the radio reception unit 211, the demodulation and decoding unit 212, the radio channel quality measurement unit 214, an encoding and demodulation unit 220, and the radio transmission unit 221.

As mentioned above, the synchronization signal synchronizes with a slot timing, and the reference signal synchronizes with an OFDM symbol timing. Therefore, the synchronization control unit 213 can cause to synchronize the radio reception unit 211 and the like with the slot timing or OFDM symbol timing by using the synchronization signal or reference signal. Thus, the synchronization control unit 213 can operate the radio reception unit 211 at timing identical to the slot timing or frame timing of the selected synchronization signal or reference signal. Therefore, the synchronization control unit 213 can operate the radio reception unit 211 and the like at the same phase (or with a phase difference equal to or less than a threshold) with the selected synchronization signal and reference signal (phase synchronization).

With respect to the synchronization signals of CC1 to CCn, the synchronization signal of CC1 and synchronization signal of CCn are synchronization signal that differ, for example, in a central frequency. Therefore, the synchronization control unit 213 can operate the radio reception unit 211 or the like at the same frequency (or a frequency difference exhibiting a threshold value or less) as the central frequency of the selected synchronization signal. With respect to the reference signal, the synchronization control unit 213 can also operate the radio reception unit 211 or the like at the same frequency as the central frequency of the selected reference signal. Therefore, the synchronization control unit 213 can operate the radio reception unit 211 or the like at the same frequency as that of the selected synchronization signal or reference signal (frequency synchronization).

Such phase synchronization and frequency synchronization make it possible to synchronize the terminal 200 with the transmission frequency (or reception frequency) of the radio signal of the base station 100.

On the other hand, the radio reception unit 211 or the radio transmission unit 221 converts the radio signal into the intermediate frequency signal, for example, based on a local oscillator signal. The synchronization control unit 213 can match the frequency of the local oscillator signal with the frequency of the selected synchronization signal or reference signal by performing the synchronization control with respect to the radio reception unit 211 or the like. Further, the synchronization control unit 213 can also match the phase timing of the local oscillator signal with the phase timing of the selected synchronization signal or reference signal. As a result, for example, the radio reception unit 211 can perform conversion into the intermediate frequency signal of adequate frequency and timing. The synchronization control unit 213 also operates the demodulation and decoding unit 212 and the encoding and modulation unit 220 to match the frequency and phase timing of the synchronization signal or reference signal. Therefore, the demodulation and decoding unit 212 can perform demodulation and decoding synchronously with the inputted data or the like.

The RSs of CC1 to CCn extraction unit 250 extracts the reference signals of CC1 to CCn from the output of the demodulation and decoding unit 212 and outputs the extracted signals to the synchronization control unit 213 and the radio channel quality measurement unit 214.

The radio channel quality measurement unit 214 measures the radio channel quality with respect to the extracted reference signals and outputs the measured quality to a radio channel quality information generation unit 215. For example, the radio channel quality measurement unit 214 measures the received field intensity or received power for each CC.

The cell selection and processing unit 217 selects the base station 100 containing, for example, a cell that has the highest reception power and satisfies other conditions with respect to the measured reception power of each CC. The cell selection and processing unit 217 outputs information on the selected cell to the random access control unit 218.

In the present embodiment, the electromagnetic wave reachable range (or region) of the base station 100 containing a cell may be taken as the cell, or a cell may be set for each single carrier wave that is transmitted and received in the electromagnetic wave reachable range. For example, the cells and CC are in one-to-one correspondence relationship, the CC1 is a band used by the base station 100 containing the cell 1, and the CCn is a band used by the base station 100 containing the cell n.

The random access control unit 218 performs random access control of the base station 100 containing the selected cell and instructs the random access control signal generation unit 219 to generate a random access control signal.

The random access control signal generation unit 219 generates a random access control signal in response to the instruction from the random access control unit 218 and outputs the generated signal to the encoding and modulation unit 220.

The encoding and modulation unit 220 encodes and modulates the transmission data, radio channel quality information, and random access control signal at the predetermined encoding ratio and by the predetermined modulation scheme. The encoding ratio and modulation scheme are, for example, indicated by the control signal or the like in advance from the base station 100.

The radio transmission unit 221, for example, allocates transmission data or the like to the predetermined resource with respect to the output from the encoding and modulation unit 220, generates the radio signal by conversion to a high-frequency signal, and outputs the generated radio signal to the antenna 210. The radio transmission unit 221 is instructed in advance from the base station 100 to perform resource allocation and, for example, holds the resource allocation information transmitted from the base station 100 and performs the allocation based on this information.

Figure 8:
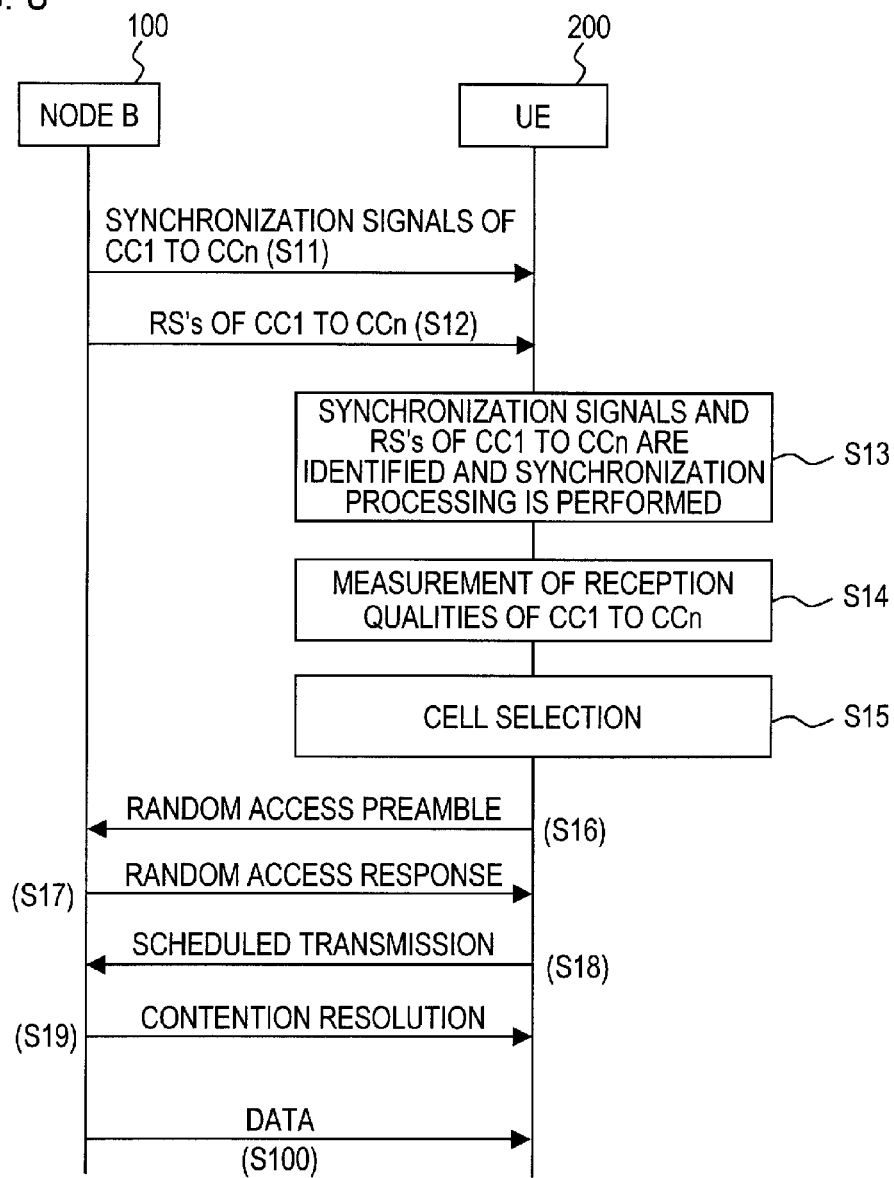
FIG. 8 is a flowchart illustrating an operation example.

The operation of synchronization processing in the cell search is described below. FIG. 8 is a flowchart illustrating an example of such processing.

Firstly, the terminal 200 receives the synchronization signals of CC1 to CCn transmitted from the base station 100 (S11). Since the base station 100 transmits the synchronization signals by using the predetermined resource (for example, FIG. 4), the terminal 200 can extract the synchronization signals of CC1 to CCn based on resource information that has been received from the base station 100 or stored in advance.

Next, the terminal 200 then receives the reference signals of CC1 to CCn transmitted from the base station 100 (S12). Since the base station 100 transmits the reference signals by using the predetermined resource, similarly to the synchronization signals (for example, FIG. 2), the terminal 200 can receive the reference signals of CC1 to CCn based on resource information.

When the terminal 200 receives the synchronization signals of CC1 to CCn and the reference signals of CC1 to CCn, the terminal 200 identifies the synchronization signals and reference signals and selects at least one optimum synchronization signal and reference signal with respect to the synchronization signals of CC1 to CCn and reference signals (S13).

Concerning the identification of the synchronization signals and reference signals, when the synchronization signals and reference signals have a different signal sequence for each CC, the synchronization control unit 213 can identify the CC to which the synchronization signal and reference signal belong by identifying the signal sequence. When the synchronization signal and reference signal have the same signal sequence, the synchronization signal and reference signal can be identified, for example, by a cell ID. For example, since the synchronization signals and reference signals have a different frequency for each cell, the synchronization control unit 213 can perform the identification by a cell ID.

The selection is performed by the terminal 200 in the following manner. For example, let us assume that a frequency accuracy of "0.1 ppm" is required as a synchronization accuracy for the terminal 200. In this case, when the terminal 200 selects the synchronization signal and reference signal of the CC that belongs to the "800 MHz" band, where the central frequency of the selected synchronization signal or the like is taken as "800 MHz", the terminal 200 can allow an error up to $800 \times 10^6 \times 10^{-7} = 80$ Hz.

On the other hand, when the terminal 200 selects the synchronization signal and reference signal of the CC of the "3.5 GHz band", where the central frequency of the selected synchronization signal or the like is taken as "3.5 GHz", the terminal 200 can allow an error up to $3.5 \times 10^9 \times 10^{-7} = 350$ Hz.

Therefore, where the terminal 200 selects the synchronization signal of the lowest frequency, that is, the synchronization signal of the CC that belongs to "800 MHz band", even if the radio signal that belongs to a frequency band of "3.5 GHz" is received, the error is within the allowed range of accuracy error of "350 Hz".

Therefore, from the standpoint of frequency error accuracy, where the synchronization control unit 213 selects the synchronization signal and reference signal of the lowest frequency (or the lowest central frequency), the error accuracy is always within the allowed range. The synchronization control unit 213 can fit the frequency error of the received signal into the allowed range by causing the radio reception unit 211 or the like to perform frequency synchronization and phase synchronization with respect to the selected synchronization signal and reference signal. Therefore, since the terminal 200 can fit the frequency error into the allowed range, the degradation of frequency accuracy can be prevented.

The selection can be also performed in the following manner. The higher is the frequency of the synchronization signal, the larger is the phase rotation. For example, the phase of the synchronization signal of the CC that belongs to the "3.5 GHz band" is larger than the phase of the synchronization signal of the CC that belongs to the "800 MHz band". As for the phase adjustment, where the synchronization signal and reference signal with the highest frequency are used, the adjustable phase range increases and finer phase adjustment can be performed. Therefore, where the synchronization control unit 213 selects the synchronization signal and reference signal of the highest frequency (or the highest central frequency), the phase difference can be adjusted with a better accuracy than in the case where other synchronization signals are selected. From the standpoint of phase difference adjustment, where the synchronization control unit 213 selects the synchronization signal and reference signal of the highest frequency (or the highest central frequency), the highly accurate phase adjustment can be performed in a wider range and the degradation of phase accuracy can be prevented.

In yet another selection mode, the synchronization control unit 213 may select the synchronization signal and reference signal of the CC that is the closest to the central frequency of the aggregated frequency band, from among the CC1 to CCn, with consideration for both the frequency accuracy and the phase frequency.

As for the number of selected signals, a plurality of synchronization signals and reference signals may be selected from the CC1 to CCn, instead of selecting one synchronization signal and one reference signal from the CC1 to CCn. For example, the synchronization control unit 213 can select the synchronization signal and reference signal with the lowest frequency, perform frequency synchronization with respect to the radio reception unit 211 and the like, or can use the synchronization signal and reference signal with the highest frequency and perform phase synchronization with respect to the radio reception unit 211 or the like. The synchronization control unit 213 can also select a plurality of signals and use the synchronization signals and reference signals separately according to circumstances.

After the selection, the terminal 200 performs the synchronization processing based on the selected synchronization signal and reference signal. In the synchronization processing, for example, the synchronization control unit 213 performs the synchronization control with respect to the radio reception unit 211 and the like, such that the frequency and phase of the local oscillator signal match the frequency and phase of the selected synchronization signal and reference signal (or the difference for the two is equal to or less than a threshold).

After the terminal 200 performs the synchronization control based on the selected synchronization signal and reference signal, the terminal measures reception qualities of CC1 to CCn based on the received reference signal (S14).

Then, the terminal 200 selects the cell based on the measured reception qualities (S15). For example, the cell selection processing unit 217 selects the cell with the best reception qualities.

The terminal 200 then executes a random access control procedure with respect to the selected cell (S16 to S19).

Thus, the terminal 200 transmits a random access preamble including a random ID and the like to the base station 100 (S16). For example, the random access control signal generation unit 219 of the terminal 200 generates the random access preamble based on the instruction from the random access control unit 218 and transmits the generated random access preamble via, for example, the encoding and modulation unit 220.

When the base station 100 receives the random access preamble, the base station transmits a random access response including, for example, timing adjustment information to the terminal 200 (S17). For example, the random access control signal extraction unit 113 extracts and outputs the random access preamble to the random access control unit 114, and the random access control unit 114 outputs the generated random access response to the random access control signal generation unit 115. The random access control signal generation unit 115 transmits the random access response to the terminal 200 via the transmission data generation unit 116 or the like.

When the terminal 200 receives the random access response, the terminal transmits a scheduled transmission including the identification information on the terminal 200 to the base station 100 (S18). For example, the random access control signal generation unit 219 performs the transmission in response to an instruction from the random access control unit 218.

When the base station 100 receives the scheduled transmission, the base station transmits a contention resolution to the terminal 200 in order to check whether or not a collision has occurred between the terminals 200 (S19). For example, the random access control signal generation unit 115 transmits condition resolution based on an instruction from the random access control unit 114.

The base station 100 then transmits data to the terminal 200 by using the usage band of broad band (S20).

For example, the base station 100 performs transmission setting of the bandwidth to "100 MHz" on occasion of the execution of the random access control procedure (S16 to S19). The transmission setting is performed, for example, by the random access control unit 114 that controls the radio transmission unit 118 and the radio reception unit 111 so that the resource bandwidth becomes "100 MHz". Alternatively, the radio reception unit 211 is provided with a BPF for removing extra frequency components present in the input signal, but the random access control unit 114 performs the transmission setting by executing the control such as to expand the bandwidth of the BPF and expand the frequency band of the reception signal that passes through. In another possible configuration, the radio reception unit 211 is provided with a FFT or an IFFT for converting the radio signal into the time region, and the random access control unit 114 performs the transmission setting by changing the FFT size to adapt to the expanded bandwidth.

On the other hand, the terminal 200 performs the reception setting such as to enable the reception of broad-band data, for example, in the synchronization processing (S13). For example, the synchronization control unit 213 performs the reception setting by controlling the radio reception unit 211 or the like so as to expand the resource or filter bandwidth or change the FFT size, in the same manner as in the case of the base station 100. As a result, the terminal 200 can receive data in a state in which broadband reception is possible and also after the synchronization performed by the selected synchronization signal and reference signal. The data may be transmitted, for example, by the terminal 200 to the base station 100.

In the above-descried example, the case is explained in which the synchronization control unit 213 selects at least one synchronization signal and reference signal, but either of the synchronization signal and reference signal may be selected. For example, since the central frequency of the synchronization signal of CC1 is same as the central frequency of the reference signal of CC1, the synchronization control unit 213 can select either of those signals to perform frequency synchronization with respect to the radio reception unit 211 and the like. Further, although the synchronization signal of CC1 and the reference signal of CC1 have different phase timing accuracy, the synchronization control unit 213 can perform phase synchronization of slot timing by selecting the synchronization signal of CC1. The synchronization control unit 213 can also perform phase synchronization of OFDM symbol timing by selecting the reference signal of CC1.

<Band-Variable Operation>

Figure 9:
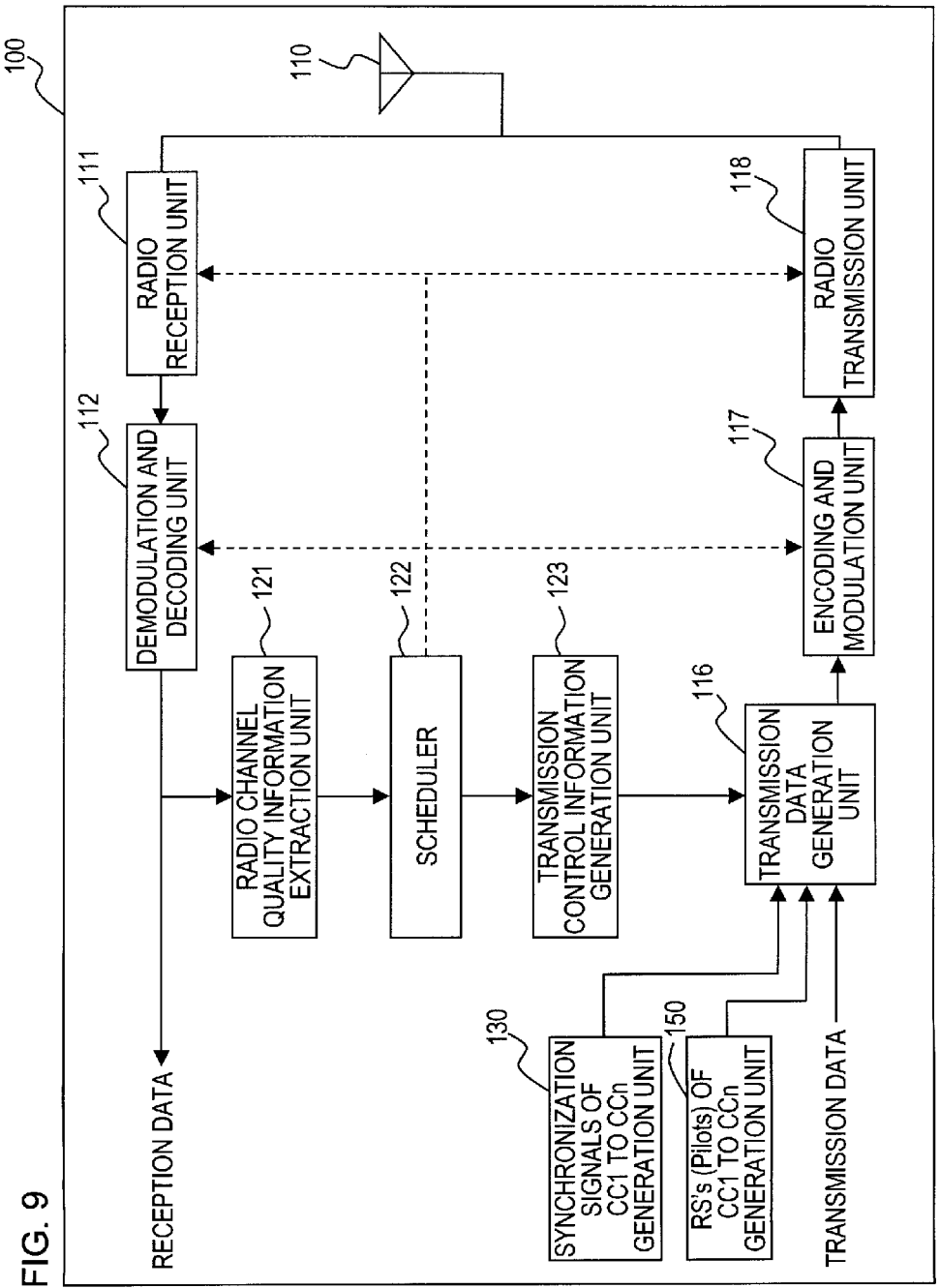
FIG. 9 illustrates a configuration example of a base station.
Figure 10:
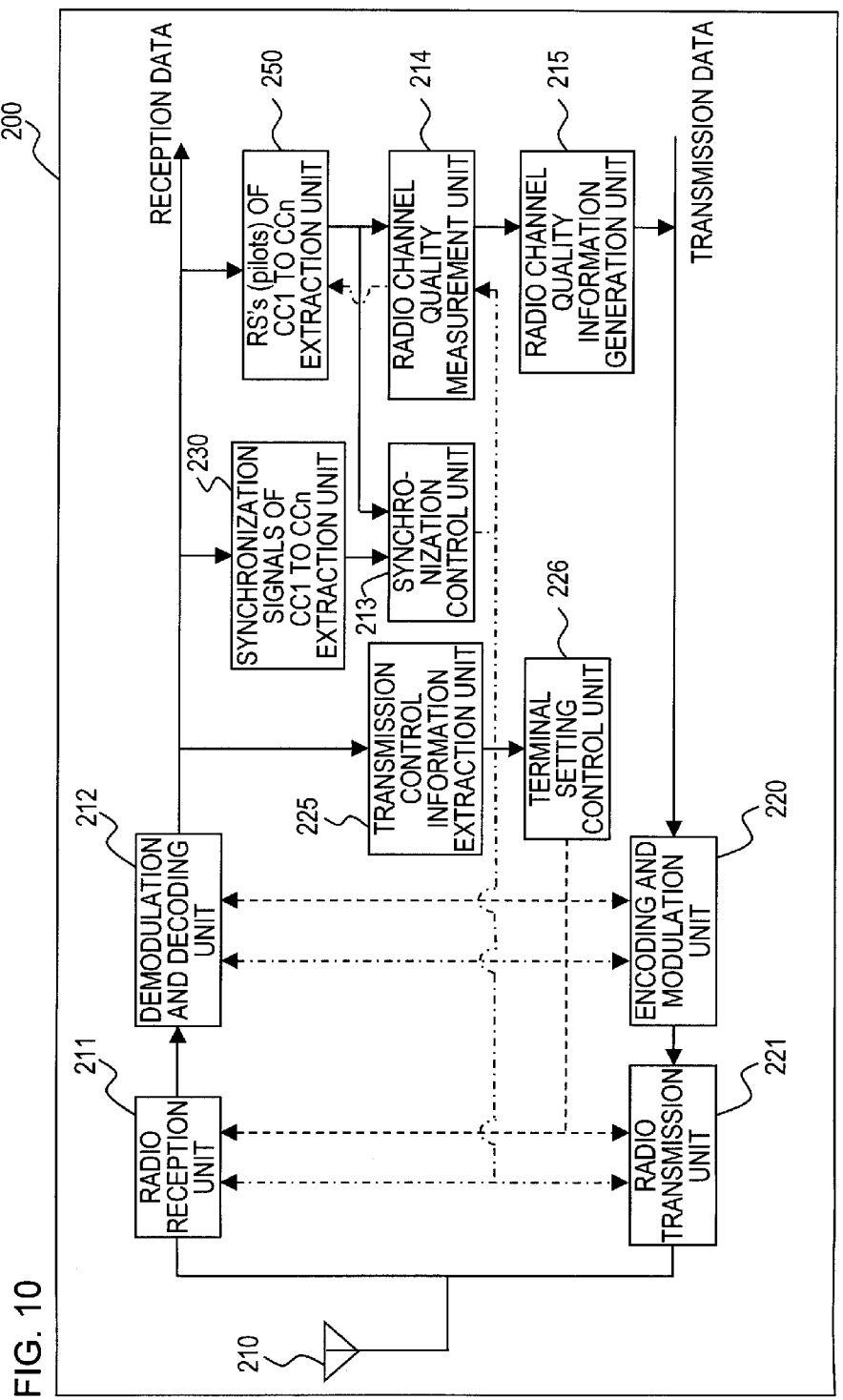
FIG. 10 illustrates a configuration example of a terminal.

The band-variable operation is explained below. FIG. 9 illustrates a configuration example of the base station 100 and FIG. 10 illustrates a configuration example of the terminal 200 in the case where such operation is performed.

The base station 100 is further provided with a radio channel quality information extraction unit 121, a scheduler 122, and a transmission control information generation unit 123.

The radio channel quality information extraction unit 121 extracts a radio channel quality information transmitted by the terminal 200 from the output of the demodulation and decoding unit 112 and outputs the extracted information to the scheduler 122.

The scheduler 122 determines the encoding ratio and modulation scheme based on the radio channel quality information and determines the expansion or reduction of the usage bandwidth of the transmission frequency or reception frequency of a radio signal when the radio signal is transmitted or received by the terminal 200. The scheduler 122 also determines the resource allocation of transmission data or the like. The scheduler 122 outputs the determined encoding ratio and modulation scheme to the encoding and modulation unit 117 and the demodulation and decoding unit 112 and outputs the determined resource information to the radio transmission unit 118 and the radio reception unit 111. When the expansion or reduction of the usage bandwidth is determined, the scheduler 122 outputs this information to the transmission control information generation unit 123.

The transmission control information generation unit 123 generates transmission control information including the expansion or reduction of the usage bandwidth based on the information from the scheduler 122 and outputs the generated information to the transmission data generation unit 116. The transmission data generation unit 116 generates a transmission control signal from the transmission control information and transmits to the terminal 200 the generated signal via the encoding and modulation unit 117 and the like.

The terminal 200 includes further a transmission control information extraction unit 225 and a terminal setting control unit 226.

The transmission control information extraction unit 225 extracts the transmission control signal from the output of the demodulation and decoding unit 212 and outputs the extracted signal as the transmission control information to the terminal setting control unit 226.

The terminal setting control unit 226 expands or reduces the usage bandwidth of the radio reception unit 211, the demodulation and decoding unit 212, the encoding and modulation unit 220, and the radio transmission unit 221 based on the transmission control information. For example, the terminal setting control unit 226 performs the processing of expanding or reducing the BPF bandwidth to control the frequency band of the signal passing through, or expanding or reducing the resource bandwidth with respect to the radio reception unit 211 or radio transmission unit 221 in the same manner as in the example relating to the cell search.

Figure 11:
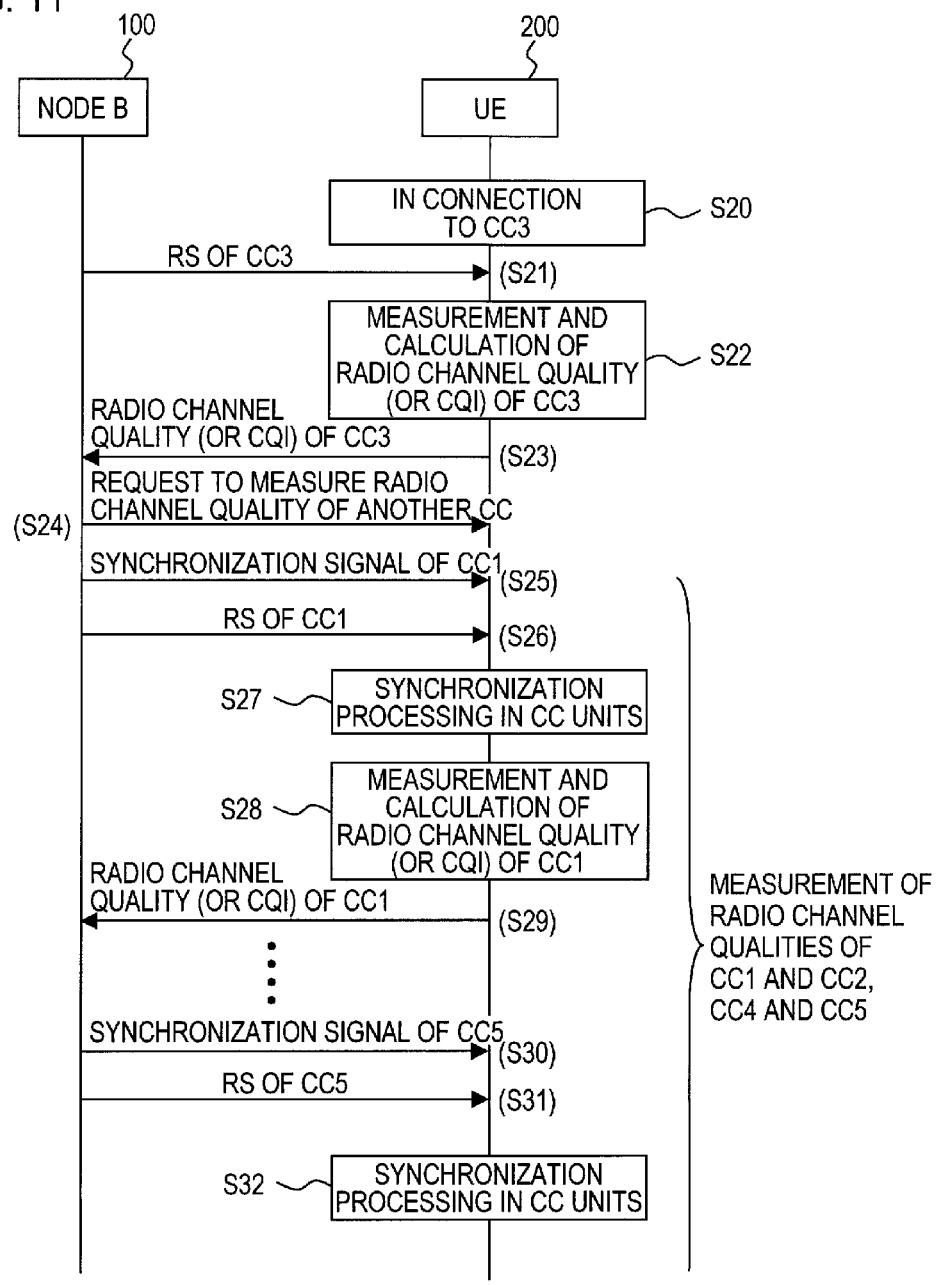
FIG. 11 is a flowchart illustrating an operation example.

The operation of synchronization processing in the band-variable operation is explained below. FIG. 11 is a flowchart illustrating an operation example. The terminal 200 is assumed to be connected to the base station 100 containing a cell corresponding to the CC3 from among the CC1 to CCn (S20).

The terminal 200 then receives the reference signal of CC3 transmitted from the base station 100 (S21) and measures or calculates a radio channel quality of CC3 (S22).

Then, the terminal 200 transmits the measured radio channel quality (or CQI (Channel Quality Indicator)) to the base station 100 (S23). For example, when the radio channel quality information generation unit 215 transmits the CQI, the radio channel quality information generation unit 215 holds each CQI, selects the CQI corresponding to the radio channel quality from the radio channel quality measurement unit 214, and transmits the selected CQI via, for example, the encoding and modulation unit 220.

When the base station 100 receives the radio channel quality information of CC3, the base station requests that the terminal 200 measure the radio channel quality of another CC (S24). For example, when the scheduler 122 inputs the radio channel quality information of CC3 from the radio channel quality information extraction unit 121, the scheduler instructs the transmission control information generation unit 123 to generate transmission control information including a request to measure the radio channel quality of another CC. Alternatively, the scheduler 122 may issue an instruction to generate a measurement request for another CC based on a request from the terminal 200. The transmission control information generation unit 123 generates the transmission control information based on such the instruction and transmits the generated transmission control information to the terminal 200 via the transmission data generation unit 116 or the like.

Upon receiving the request to measure the radio channel quality of another CC, the terminal 200 receives the synchronization signal of CC1 (S25). For example, the radio reception unit 211 stores in advance the resource allocation information corresponding to the synchronization signal of CC1 and extracts the synchronization signal of CC1 from the received signal based on the resource allocation information. The synchronization signals of CC1 to CCn extraction unit 230 extracts the synchronization signal of CC1 from the output of the demodulation and decoding unit 212.

Then, the terminal 200 receives the reference signal of CC1 (S26). For example, the radio reception unit 211 performs demapping of the reference signal of CC1 based on resource information or the like, and the RSs of CC1 to CCn extraction unit 250 extracts the reference signal of CC1 from the output of the demodulation and decoding unit 212.

The terminal 200 then performs the synchronization processing in CC units (S27). For example, the synchronization control unit 213 performs frequency synchronization and phase synchronization with the synchronization signal of CC1 or reference signal with respect to the radio reception unit 211, the demodulation and decoding unit 212, the radio channel quality measurement unit 214, the encoding and modulation unit 220, and the radio transmission unit 221. The synchronization control unit 213 controls the radio reception unit 211 or the like, for example, so that the local oscillator signal matches (or the difference is equal to or less than a threshold) the frequency and phase of the synchronization signal of CC1 and reference signal, in the same manner as in the cell search operation.

Upon completing the synchronization processing, the terminal 200 measures or calculates the radio channel quality of CC1 (S28). For example, the RSs of CC1 to CCn extraction unit 250 outputs the extracted reference signal of CC1 to the radio channel quality measurement unit 214, and the radio channel quality information generation unit 215 measures the reception field intensity or reception power with respect to the extracted reference signal of CC1.

The terminal 200 then transmits the radio channel quality of CC1 (or CQI) to the base station 100 (S29).

Figure 12:
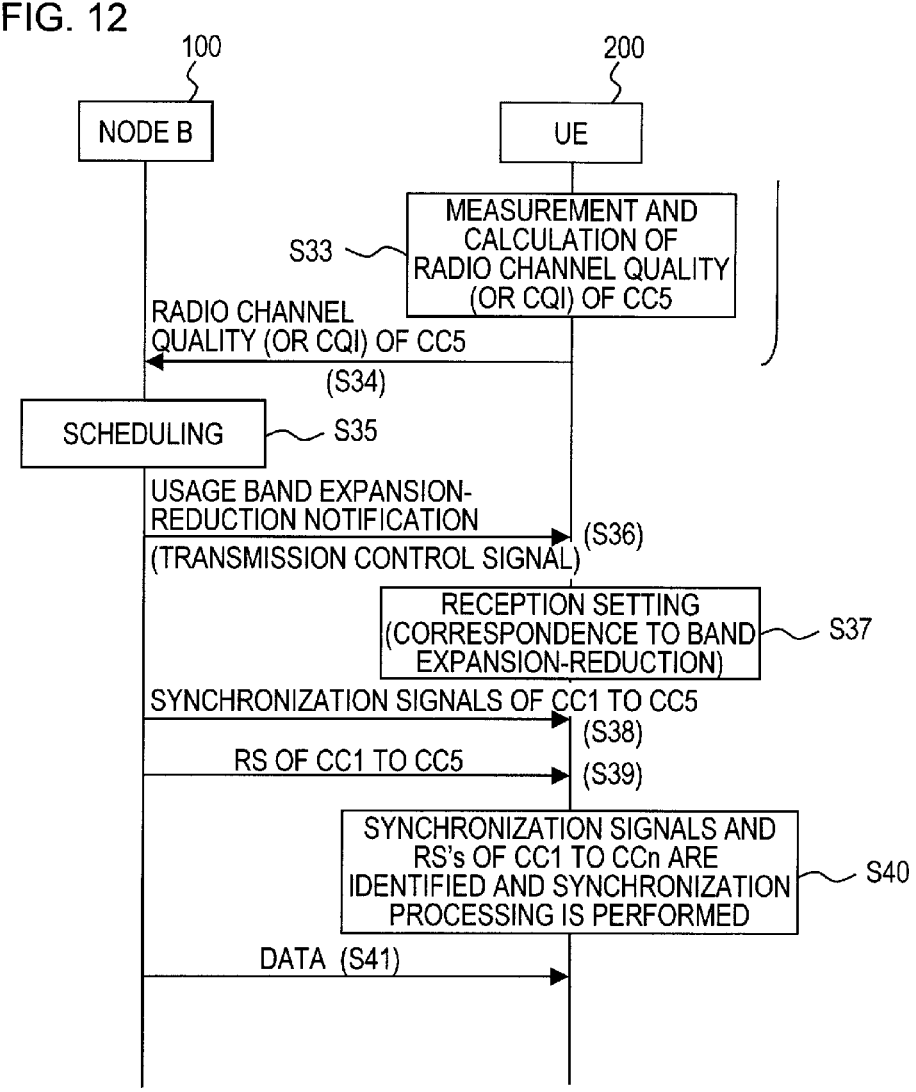
FIG. 12 is a flowchart illustrating an operation example.

The terminal 200 transmits the radio channel quality or the like relating to the CC1 to the base station 100 by performing the processing of steps S24 to S29. By performing the processing similar to that of steps S24 to S29, the terminal 200 can transmit to the base station 100 the radio channel quality relating to another CC, for example, CC2, CC4, and CC5. By performing the processing of steps S29 to S34 in the sequence illustrated in FIG. 11 and FIG. 12, the terminal 200 can transmit to the base station 100 the radio channel quality relating components carriers up to the CC5.

Upon receiving the radio channel quality relating to the CC5, the base station 100 determines the expansion or reduction of the usage band of the terminal 200 by scheduling (S35). For example, the scheduler 122 can determine the expansion or reduction of the usage band by selecting a radio channel quality that is equal to or higher than a threshold from the received radio channel quality and taking the CC corresponding to the selected radio channel quality as the usage band. The scheduler 122 can also determine the expansion or reduction of the usage band by taking as the usage band the CC corresponding to the radio channel quality that is equal to or higher than the radio channel quality of the usage band, or by taking as the usage band the CC adjacent to the CC that has been connected. In the case where one cell is realized by one CC, the CC corresponding to the adjacent cell can be similarly determined as the usage band. In the example illustrated by FIG. 12, the scheduler 122 takes the CC1 to CC5 as the usage bands and determines the expansion of the bandwidth.

The base station 100 then transmits a usage bandwidth expansion or reduction notification (referred to hereinbelow as "usage band notification") to the terminal 200 (S36). For example, the transmission control information generation unit 123 generates transmission control information including an instruction to expand or reduce the usage bandwidth and transmits the generated transmission control information as a transmission control signal. For example, the transmission control information generation unit 123 includes the information as to which of the CC is to be taken as the usage band (in the example illustrated by FIG. 12, the CC1 to CC5) in the transmission control information.

When the expansion or reduction of the usage band is determined by the scheduling (S35) or when the usage band notification is transmitted (S36), the base station 100 performs a transmission setting for expanding or reducing the band. For example, the radio reception unit 111 and the radio transmission unit 118 or the like perform the transmission setting of expanding or reducing the band filter range, or expanding or reducing the FFT size based on the instruction from the scheduler 122. As a result, for example, the base station 100 can transmit data or the like in the expanded or reduced bandwidth.

Upon receiving the usage band notification, the terminal 200 expands the usage band or performs the reception setting (S37). For example, the terminal setting control unit 226 performs the processing of expanding or reducing the range of the band filter such as the BPF in the radio reception unit 211 and radio transmission unit 221 similarly to the transmission setting in the base station 100. As a result, for example, the terminal 200 can receive data or the like transmitted in the expanded or reduced band.

The terminal 200 then receives the synchronization signals of CC1 to CCn (S38). For example, the radio reception unit 211 can receive the synchronization signals based on the resource allocation information that has been stored in advance (or transmitted in advance).

The terminal 200 then receives the reference signals of CC1 to CCn (S39). For example, the radio reception unit 211 can receive the reference signals based on the resource allocation information in the same manner as in S38.

The terminal 200 then selects at least one synchronization signal and at least one reference signal from among the synchronization signals of CC1 to CCn and the reference signals of CC1 to CCn and performs the synchronization processing based on the selected synchronization signal and reference signal (S40).

The selection may be performed by the synchronization control unit 213 in the same manner as during the cell search (S13) by selecting the synchronization signal and reference signal with the highest frequency where the emphasis is on the phase accuracy or by selecting the synchronization signal and reference signal with the lowest frequency when the emphasis is on the frequency accuracy. Further, the synchronization control unit 213 may also select the synchronization signal and reference signal of the CC that is the closest to the central frequency of the aggregated frequency band. Alternatively, the synchronization control unit 213 can select a plurality of synchronization signals and reference signals. Furthermore, as an example of selection, the synchronization control unit 213 may select the synchronization signal and reference signal of the CC adjacent to the connected cell. When one cell is realized by one CC, the CC corresponding to the adjacent cell may be similarly selected as the usage band. As a result, since the synchronization signal of the highest frequency is selected or the synchronization signal of the lowest frequency is selected, in the same manner as in the example relating to the cell search, the degradation of phase accuracy or frequency accuracy of the terminal 200 can be prevented.

The terminal 200 can perform the selection in the same manner also when the base station 100 transmits the usage band notification indicating the reduction of the usage bandwidth. In this case, for example, the base station 100 transmits the synchronization signal or the reference signal for each reduced bandwidth (for example, CC2 to CC4 when the usage bandwidth CC1 to CC5 is reduced to CC2 to CC4). The base station 100 also issues the usage band notification indicating the usage band. The terminal 200 selects the synchronization signal and reference signal with the highest frequency from among the synchronization signals and reference signals of each reduced bandwidth (for example, CC2 to CC4) included in the usage band notification, for example, based on those synchronization signals and reference signals. Further, in the case of reduction, the terminal setting control unit 226 performs the control, e.g. of changing the FFT size to match the reduction, with respect to the radio reception unit 211 and the like.

In the synchronization processing after the selection, the synchronization control unit 213 performs the synchronization processing with respect to the radio reception unit 211, the demodulation and decoding unit 212, the radio channel quality measurement unit 214, the encoding and modulation unit 220, and the radio transmission unit 221 similarly to the synchronization processing (S13) in the cell search operation. For example, the synchronization control unit 213 performs frequency synchronization or phase synchronization of the local oscillator signal of the radio reception unit 211 or the like with the selected synchronization signal or reference signal (so that the difference in frequency and the difference in phase are both equal to or less than thresholds).

The terminal 200 then receives the data transmitted in the expanded or reduced band (S41).

The synchronization control unit 213 may also select any of the synchronization signals or reference signals in the band-variable operation (S40). The synchronization control unit 213 can perform frequency synchronization of the radio reception unit 211 or the like by selecting either of the signals. The synchronization control unit 213 can also perform phase synchronization of the slot timing by selecting the synchronization signal of CC1. Furthermore, the synchronization control unit 213 can perform phase synchronization of the OFDM symbol timing by selecting the CC1 reference signal.

<Other Embodiments>

Figure 13:
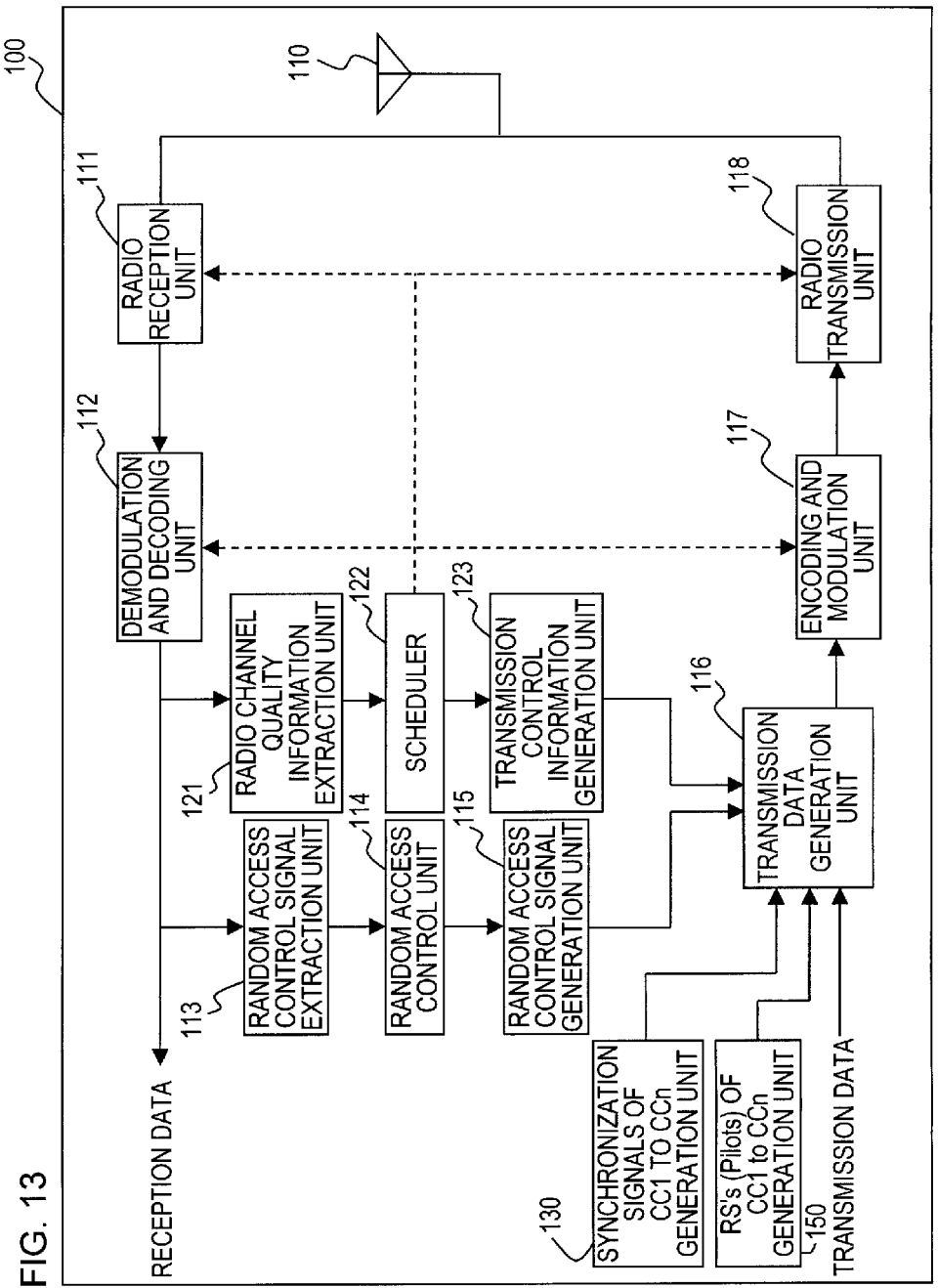
FIG. 13 illustrates a configuration example of a base station.
Figure 14:
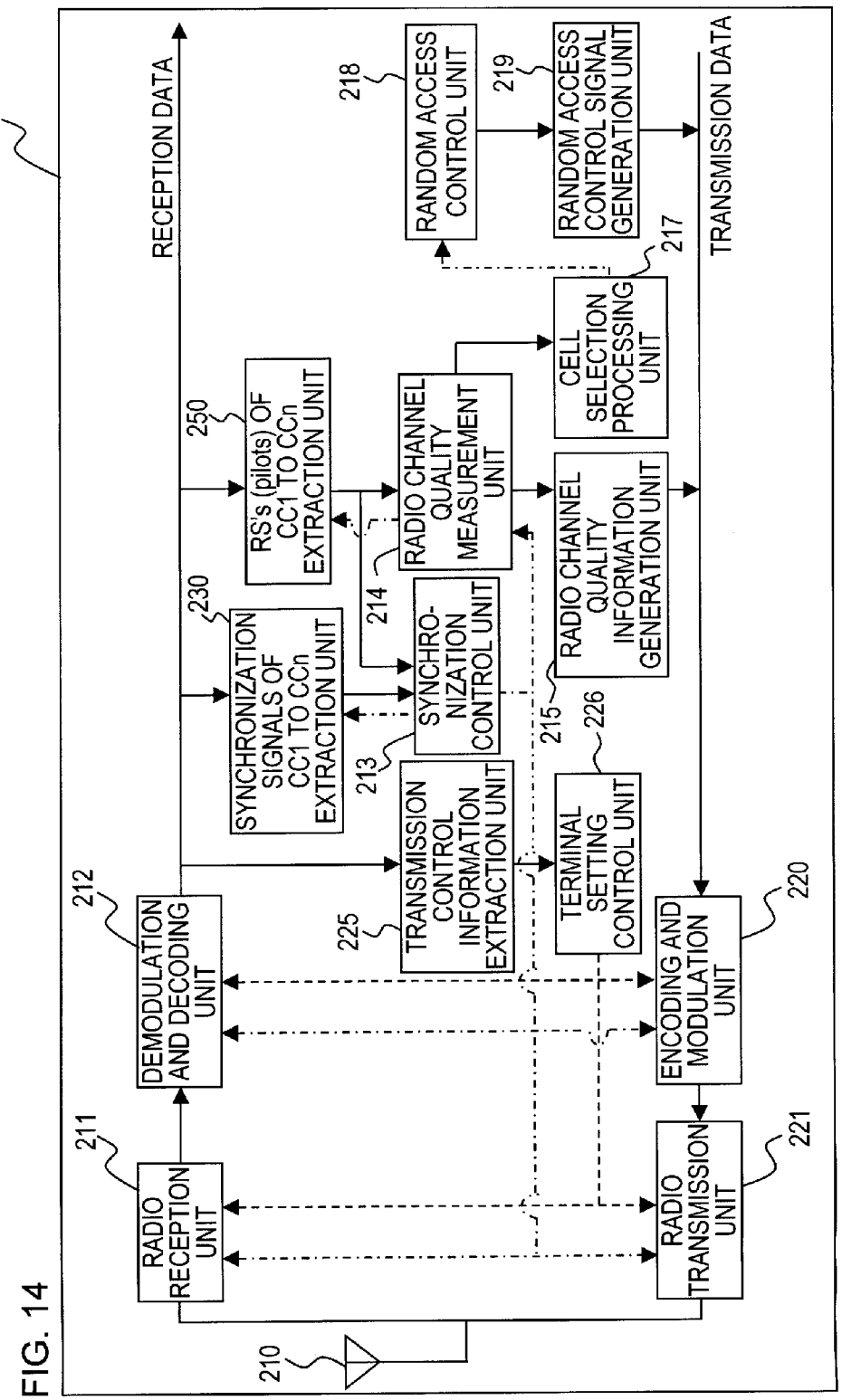
FIG. 14 illustrates a configuration example of a terminal.

The base station 100 and the terminal 200 are each explained hereinabove in two configuration examples to facilitate the explanation. For example, a combination of the configuration example of the base station 100 used when performing the cell search (for example, FIG. 6) and the configuration example of the base station 100 used when performing the bandwidth-variable operation (for example, FIG. 9) may be used as a configuration example of the base station 100. The configuration example of the base station 100 relating to such a case is illustrated by FIG. 13. The configuration example of the terminal 200 relating to such a case is illustrated by FIG. 14. The terminal 200 similarly includes all of the configurations of the terminal 200 illustrated by FIG. 7 and the terminal 200 illustrated by FIG. 10. Both the cell search processing (S11 to S19, S100) and the processing in the bandwidth-variable operation (S20 to S41) can be realized by the base station 100 illustrated by FIG. 13 and the terminal 200 illustrated by FIG. 14. In this case, the processing of bandwidth expansion in the base station 100 included in the cell search processing may be implemented, for example, by controlling the radio reception unit 111 or the like with the scheduler 122. The processing of bandwidth expansion in the terminal 200 included in the cell search processing may be also implemented, for example, by controlling the radio reception unit 211 or the like with the terminal setting control unit 226.

There are different variations of the synchronization signals of CC1 to CCn generation unit 130 and the RSs of CC1 to CCn generation unit 150 in the base station 100.

Figure 15:
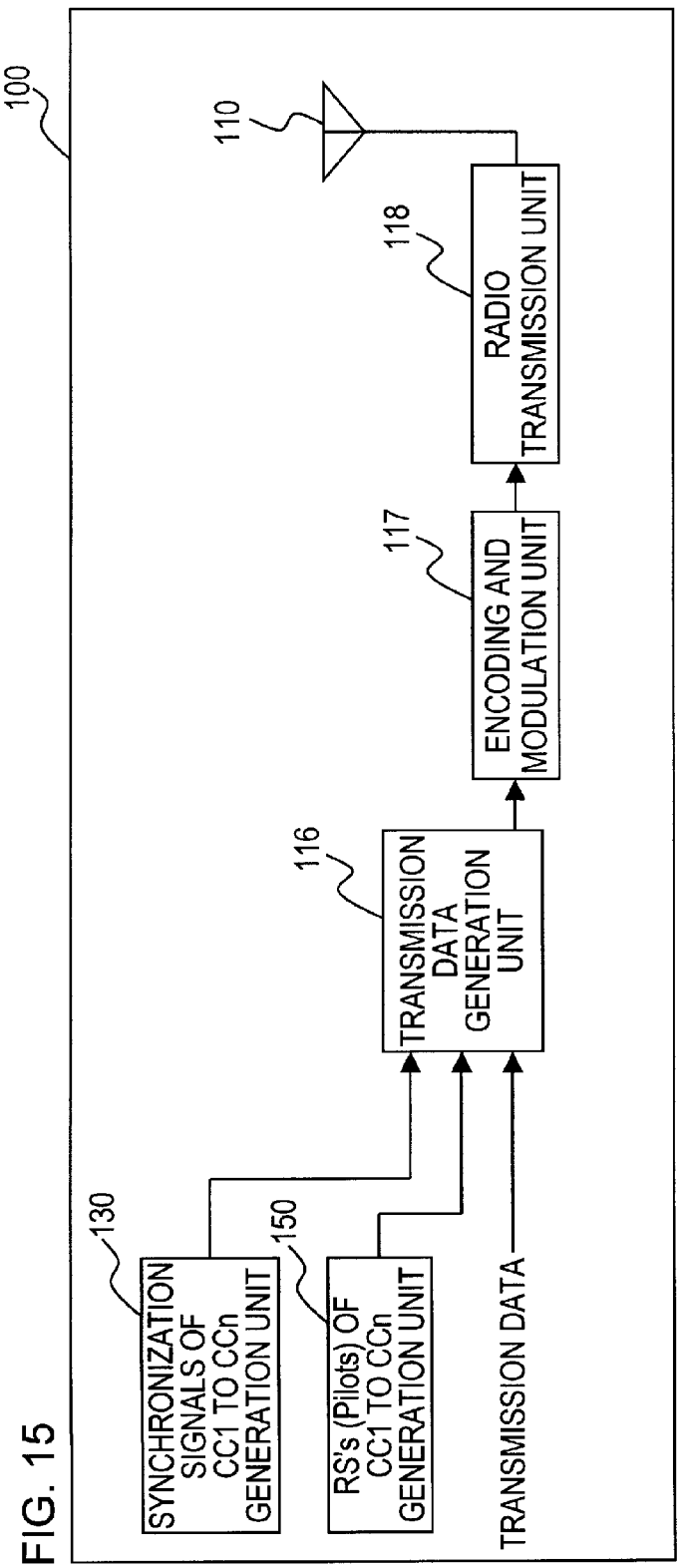
FIG. 15 illustrates a configuration example of a transmission system of a base station.

FIG. 15 illustrates an example of a transmission system (the synchronization signals of CC1 to CCn generation unit 130, the RSs of CC1 to CCn generation unit 150, and from the transmission data generation unit 116 to the antenna 110) in the base station 100. This base station 100 includes the transmission system of the base station 100 illustrated by FIG. 6, FIG. 9, and FIG. 13.

Figure 16:
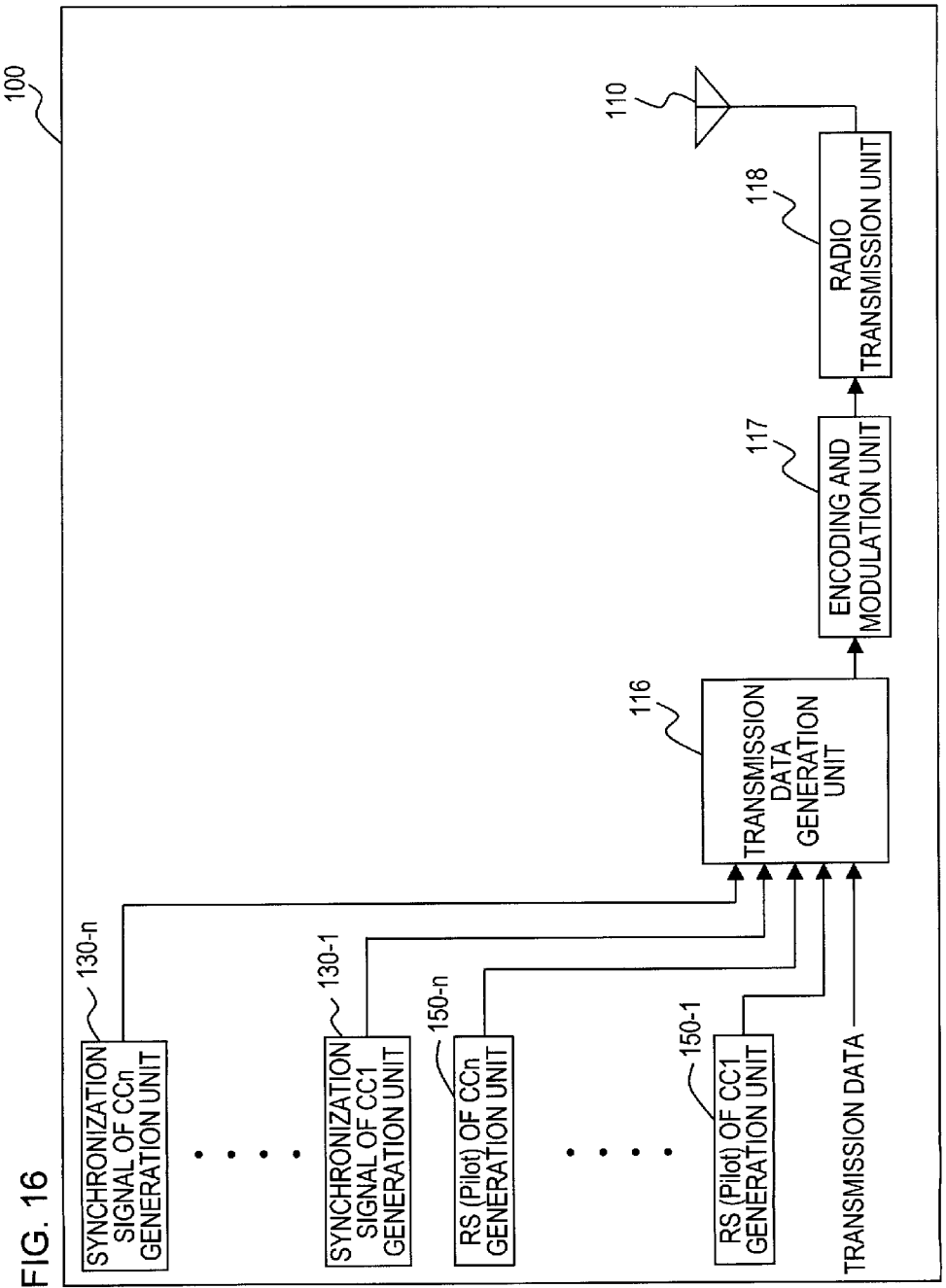
FIG. 16 illustrates a configuration example of a transmission system of a base station.

FIG. 16 illustrates another configuration example relating to the transmission system of the base station 100. This base station 100 includes further a synchronization signal of CC1 generation unit 130-1 to synchronization signal of CCn generation unit 130-n and a RS of CC1 generation unit 150-1 to RS of CCn generation unit 150-n. FIG. 16 is an example including the synchronization signal generation unit and the RS generation unit for each CC.

Each synchronization signal generation unit 130-1 to 130-n generates a different synchronization signal for each CC, similarly to the synchronization signals of CC1 to CCn generation unit 130. Further, each RS generation unit 150-1 to 150-n also generates a different reference signal for each CC, similarly to the RSs of CC1 to CCn generation unit 150.

Figure 17:
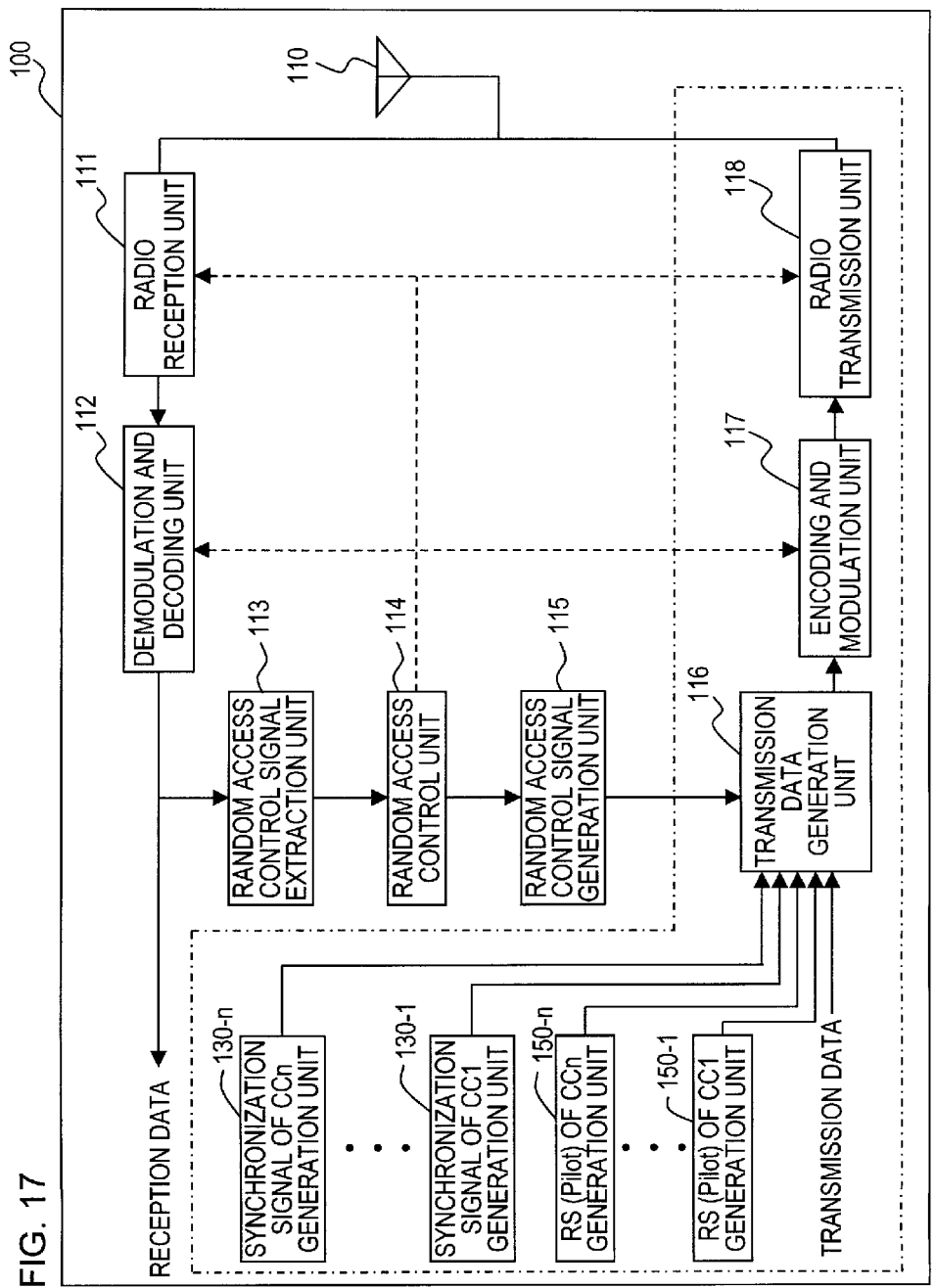
FIG. 17 illustrates a configuration example of a base station.
Figure 18:
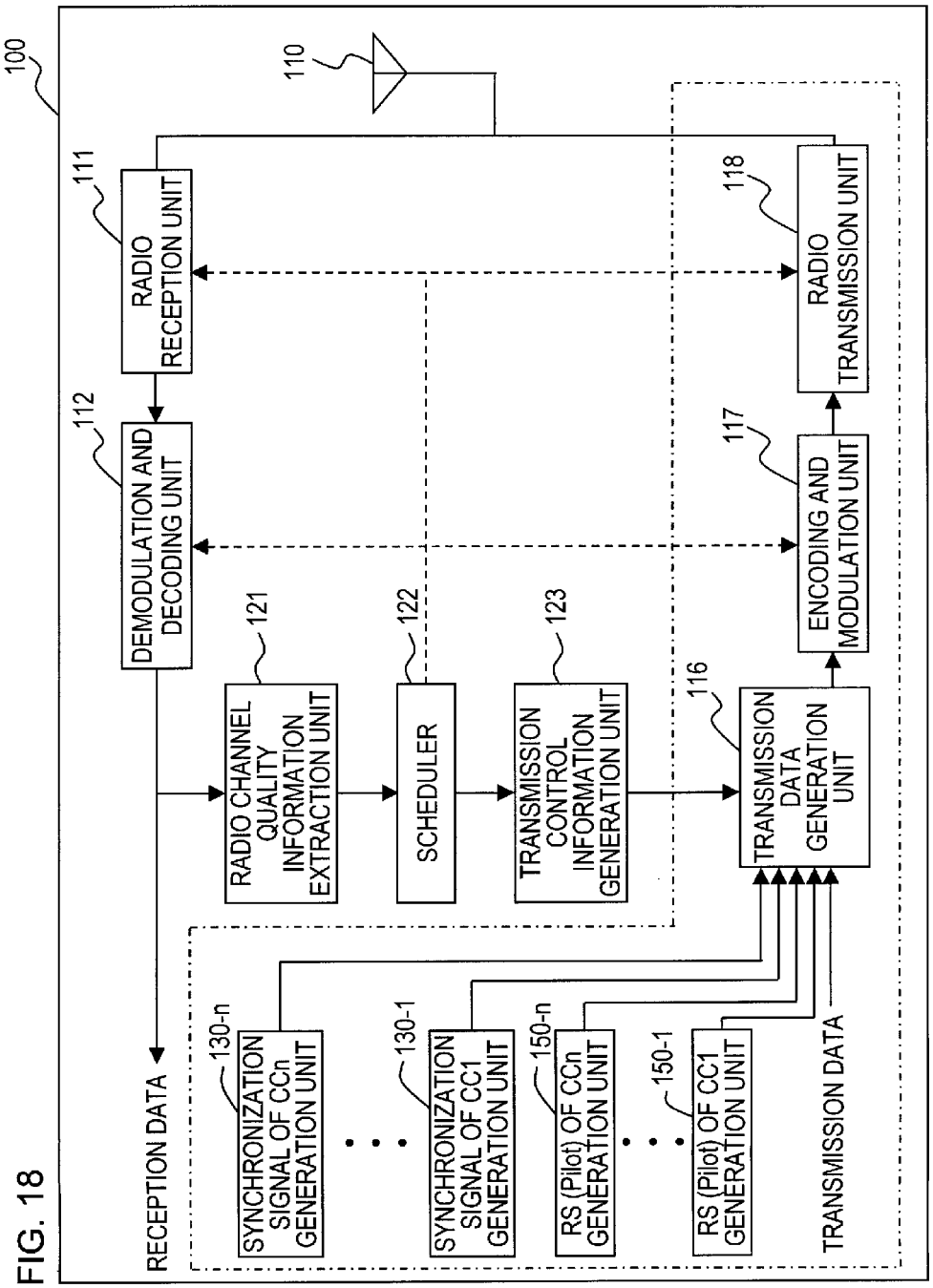
FIG. 18 illustrates a configuration example of a base station.
Figure 19:
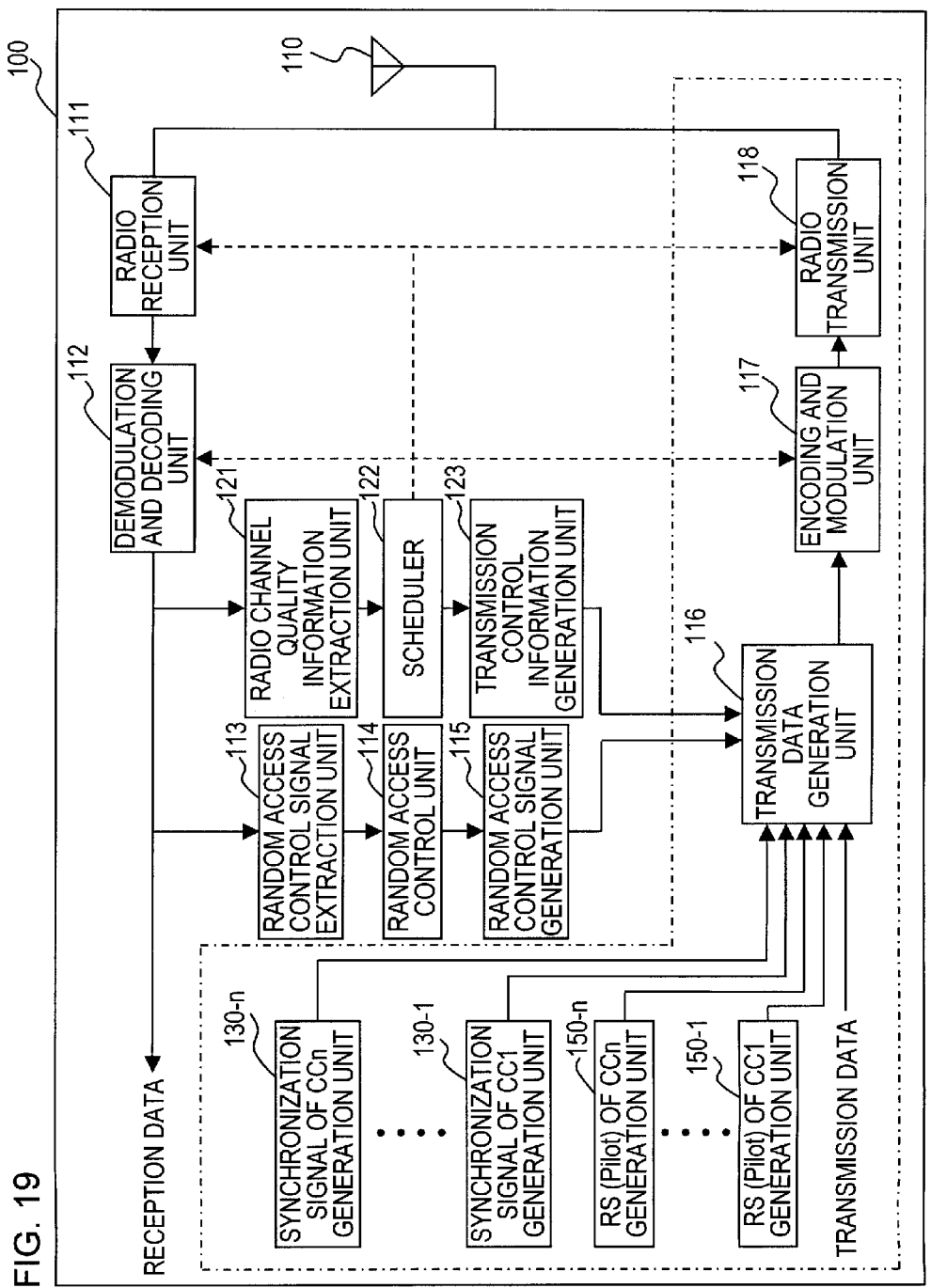
FIG. 19 illustrates a configuration example of a base station.

FIG. 17 to FIG. 19 illustrate a configuration example of the entire base station 100 including such synchronization signal generation units 130-1 to 130-n and RS generation units 150-1 to 150-n. Thus, FIG. 17 illustrates a configuration example of the base station 100 in the case where the cell search is performed, FIG. 18 illustrates a configuration example of the base station 100 in the case where the band-variable operation is performed, and FIG. 19 illustrates a configuration example of the base station 100 in the case where both the cell search and the band-variable operation can be implemented. The terminal 200 may extract the synchronization signal and reference signal for each CC, therefore the extraction can be implemented by the terminal 200 illustrated by FIG. 7, FIG. 10, or FIG. 14.

Figure 20:
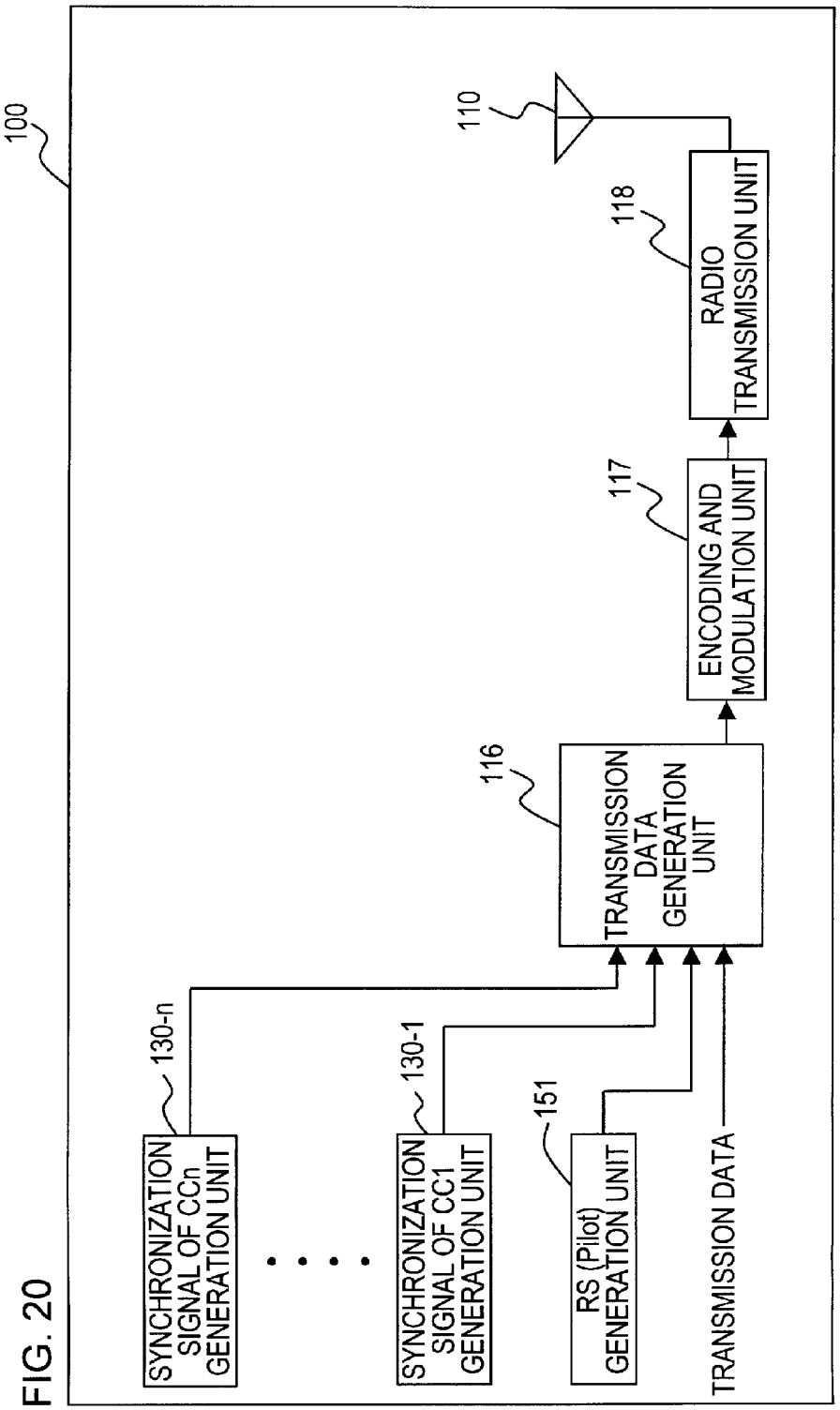
FIG. 20 illustrates a configuration example of a transmission system of a base station.

FIG. 20 illustrates a configuration example of the base station 100 in which the synchronization signal generation units 130-1 to 130-n are configured separately for each CC and which includes further a RS generation unit 151. In this case, since the RS generation unit 151 generates the reference signal of one type, for example, the base station 100 transmits the same reference signal (S12 etc.). On the other hand, the terminal 200 performs the synchronization processing (S13, S40, etc.) by the selected synchronization signal and the aforementioned reference signal, without performing identification or the like with respect to the reference signal. For example, since the central frequency of the synchronization signal of CC1 is equal to the central frequency of the reference signal of CC1, the terminal 200 can perform at least frequency synchronization by selecting either of them. The timing synchronization in slot units is possible by using the selected synchronization signal.

Figure 21:
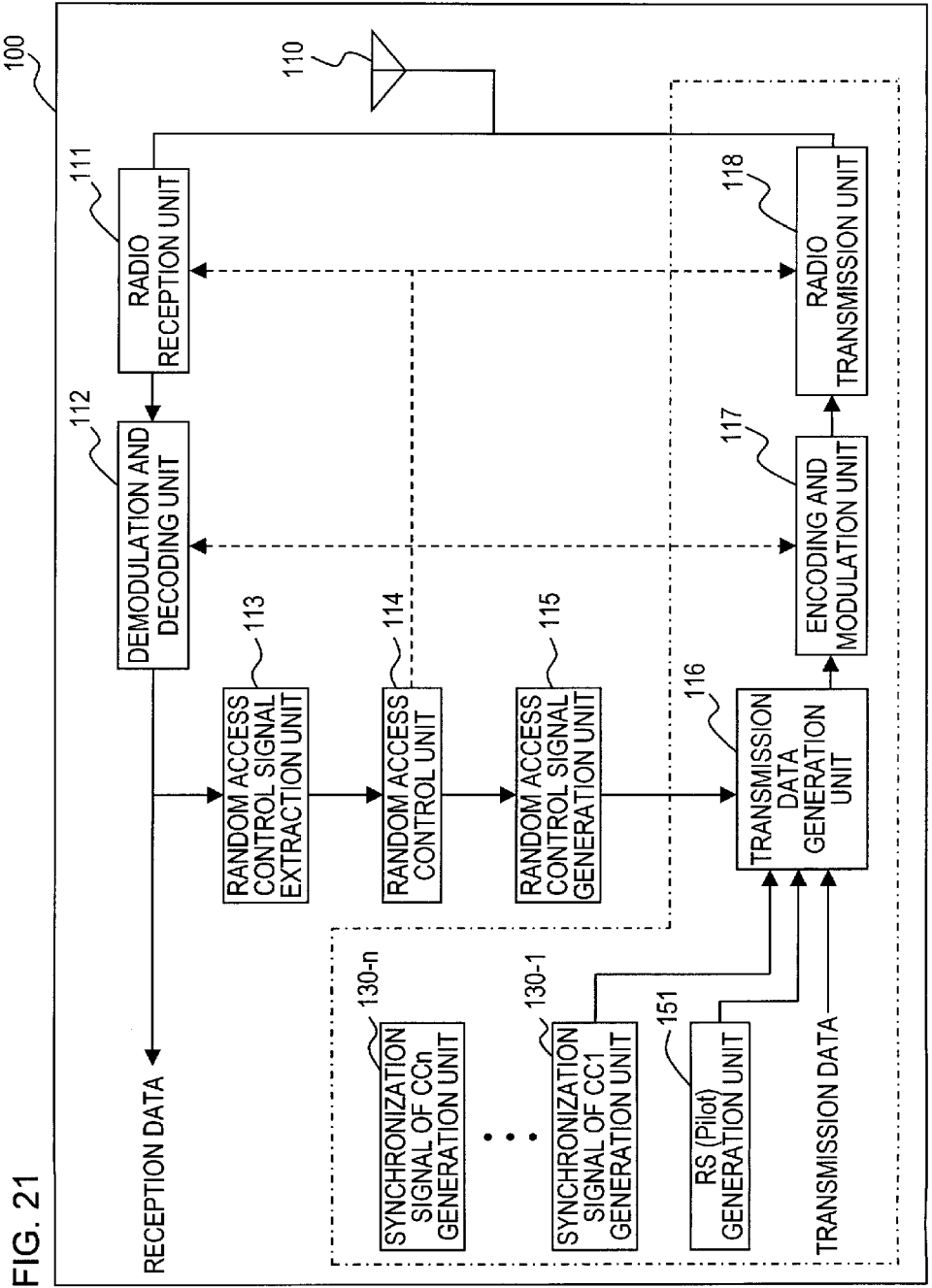
FIG. 21 illustrates a configuration example of a base station.
Figure 22:
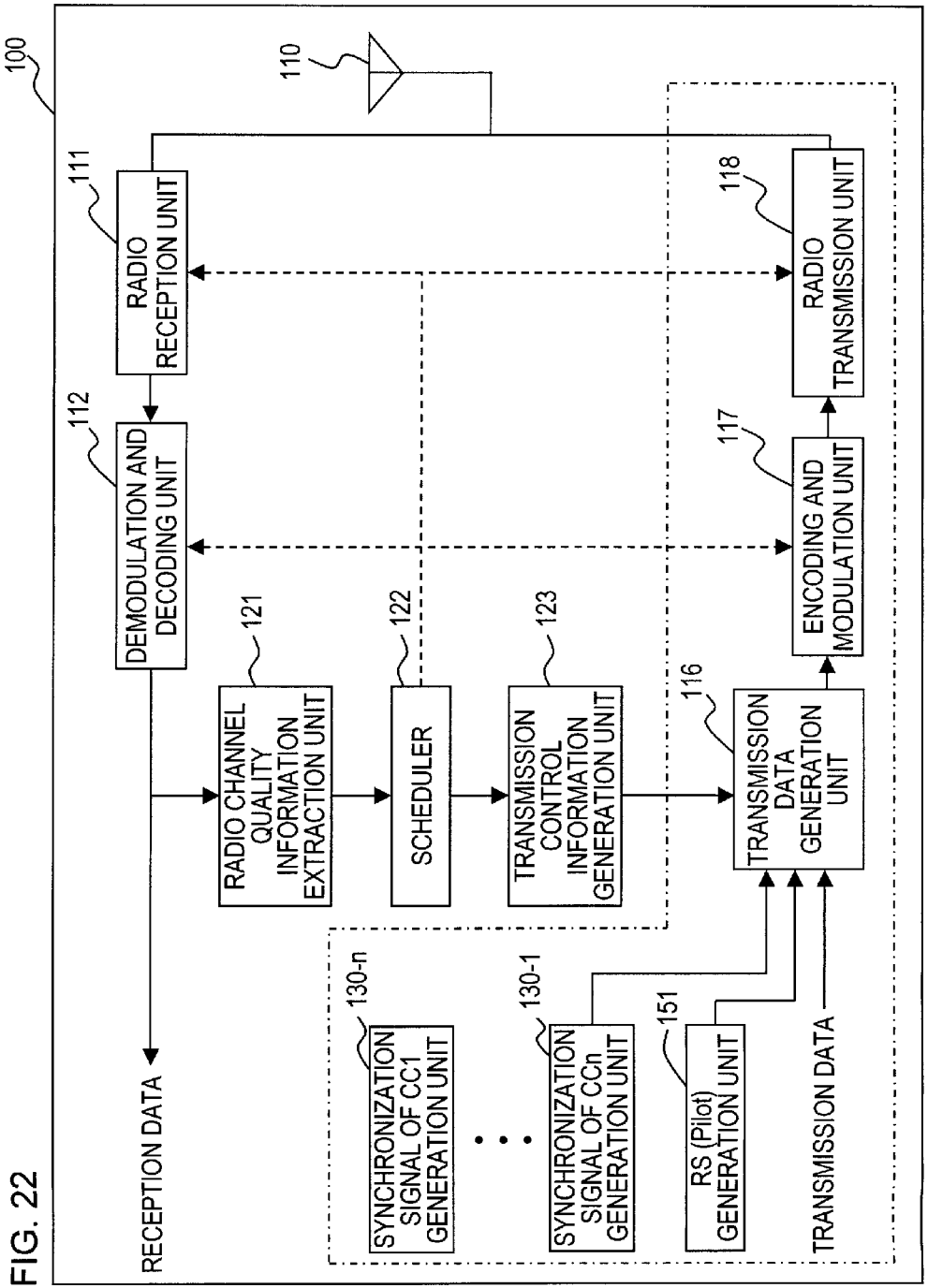
FIG. 22 illustrates a configuration example of a base station.
Figure 23:
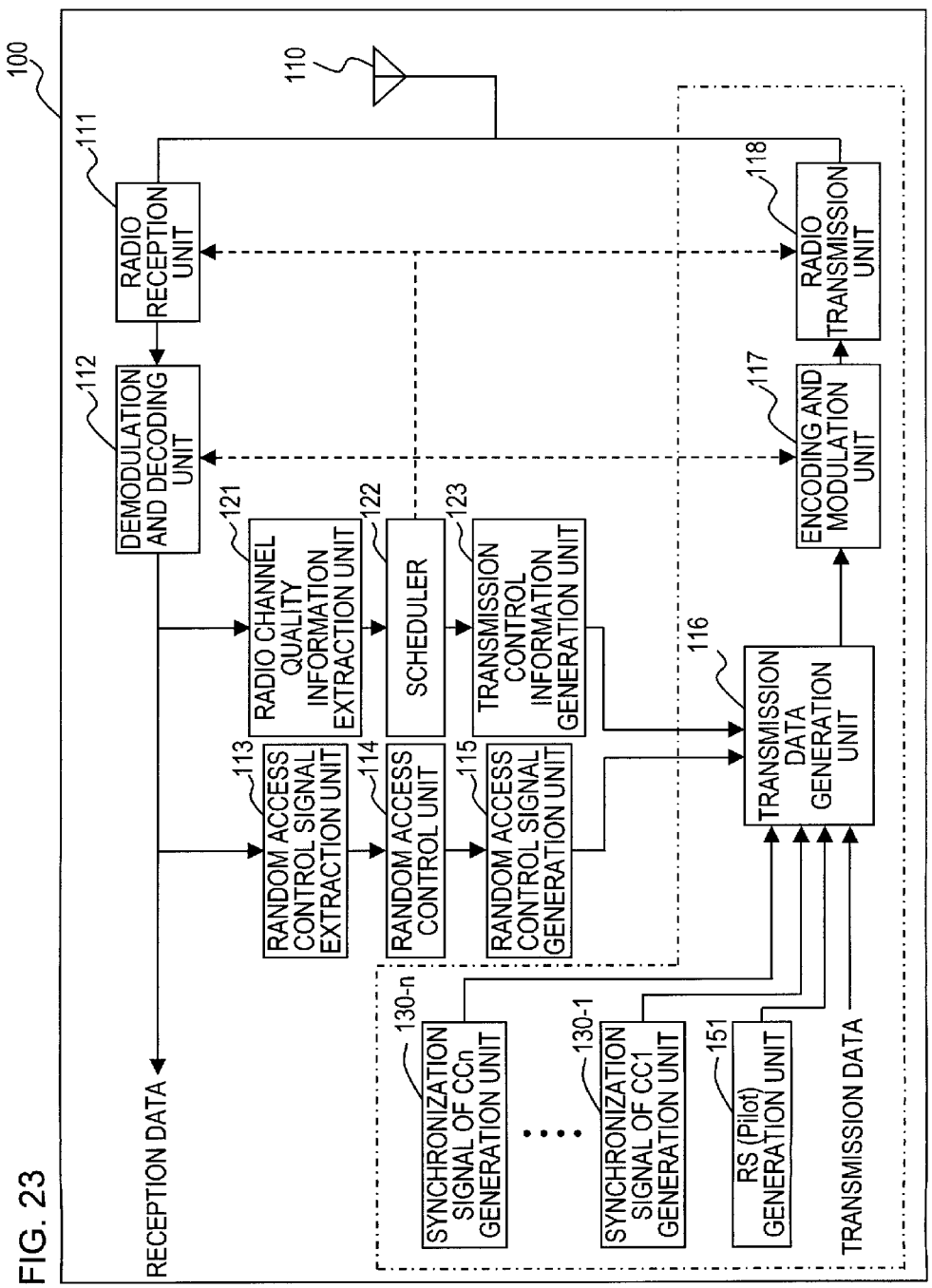
FIG. 23 illustrates a configuration example of a base station.
Figure 24:
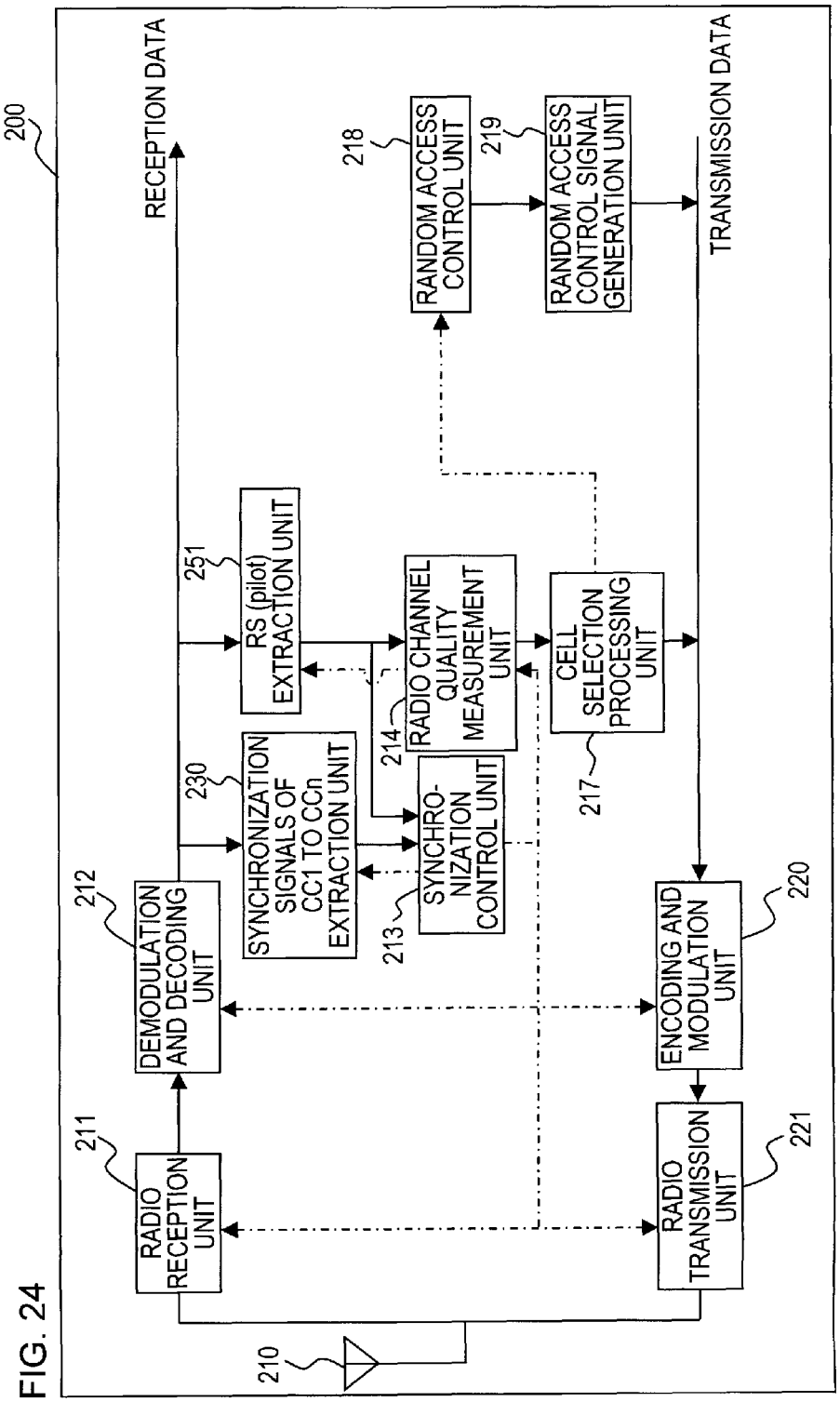
FIG. 24 illustrates a configuration example of a terminal.
Figure 25:
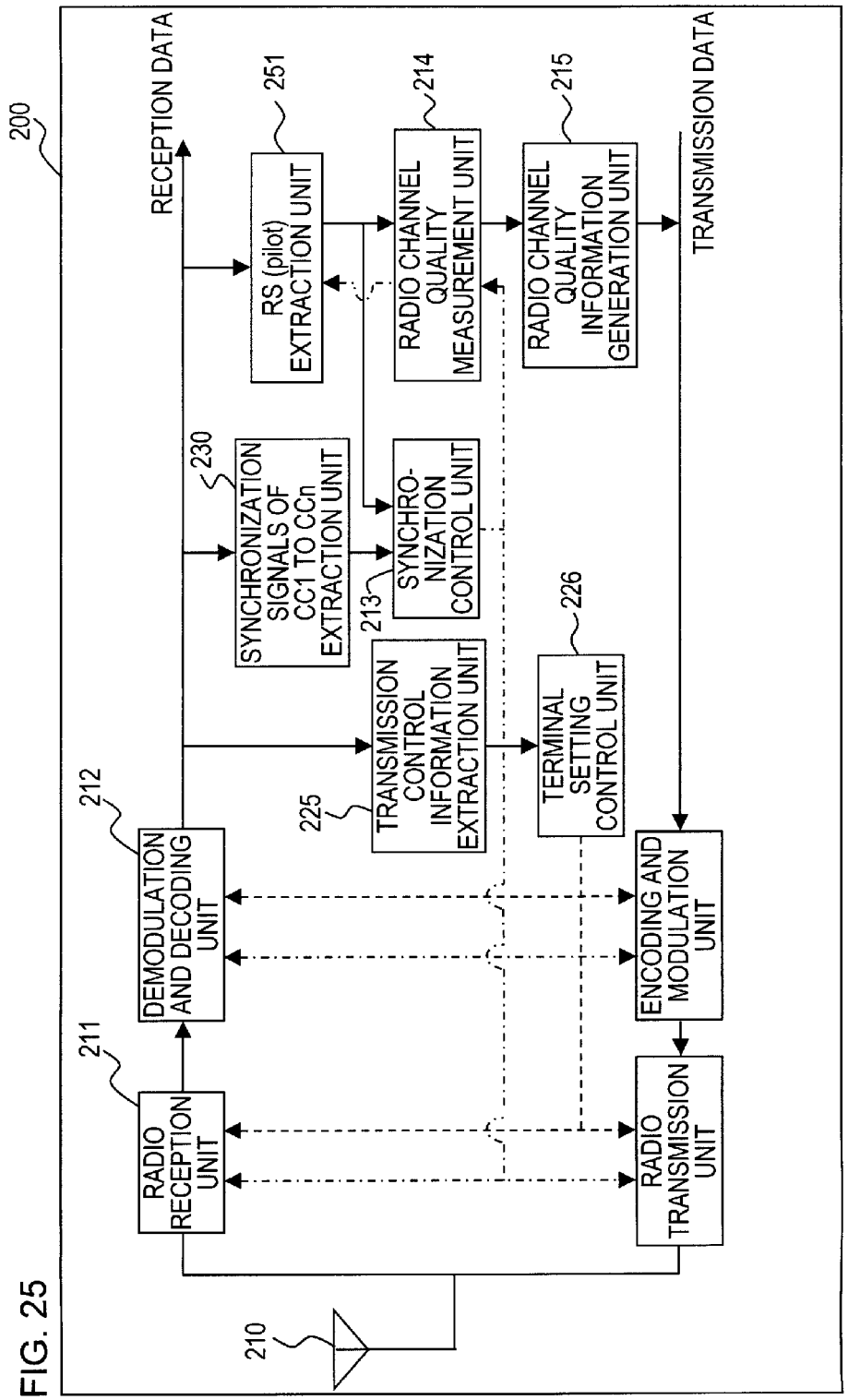
FIG. 25 illustrates a configuration example of a terminal.
Figure 26:
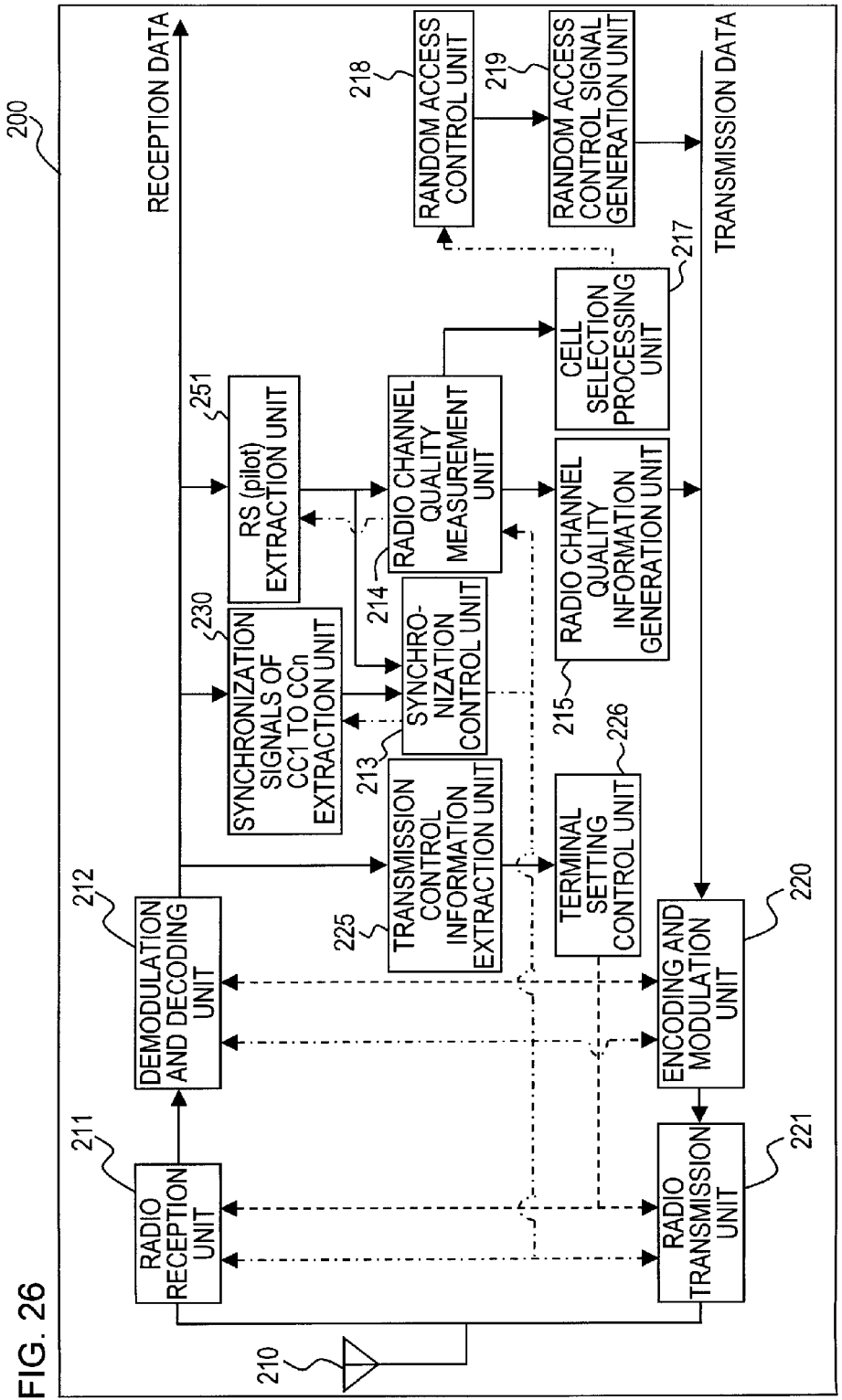
FIG. 26 illustrates a configuration example of a terminal.

FIG. 21 to FIG. 23 illustrate configuration examples of the entire base station 100 including the transmission system illustrated by FIG. 20. FIG. 21, FIG. 22, and FIG. 23 illustrate configuration examples of the base station 100 relating to the cases where the cell search is performed, the band-variable operation is performed, and both the cell search and the band-variable operation can be implemented, respectively. FIG. 24 to FIG. 26 illustrate configuration examples of the terminal 200 relating to such cases. Thus, FIG. 24, FIG. 25, and FIG. 26 illustrate the configuration examples of the terminal 200 relating to the cases where the cell search is performed, the band-variable operation is performed, and both the cell search and the band-variable operation can be implemented, respectively. In the configurations illustrated by FIG. 24 to FIG. 26, the terminal 200 includes further a RS extraction unit 251. The RS extraction unit 251 extracts the reference signal from the output of the demodulation and decoding unit 212 and outputs the extracted reference signal to the synchronization control unit 213 and the radio channel quality measurement unit 214. The synchronization control unit 213 selects at least one synchronization signal from the synchronization signals of CC1 to CCn. The selection is performed in the same manner as in the above-described example. The synchronization control unit 213 performs frequency synchronization and phase synchronization of the radio reception unit 211 and the like based on the reference signal and the selected synchronization signal.

Figure 27:
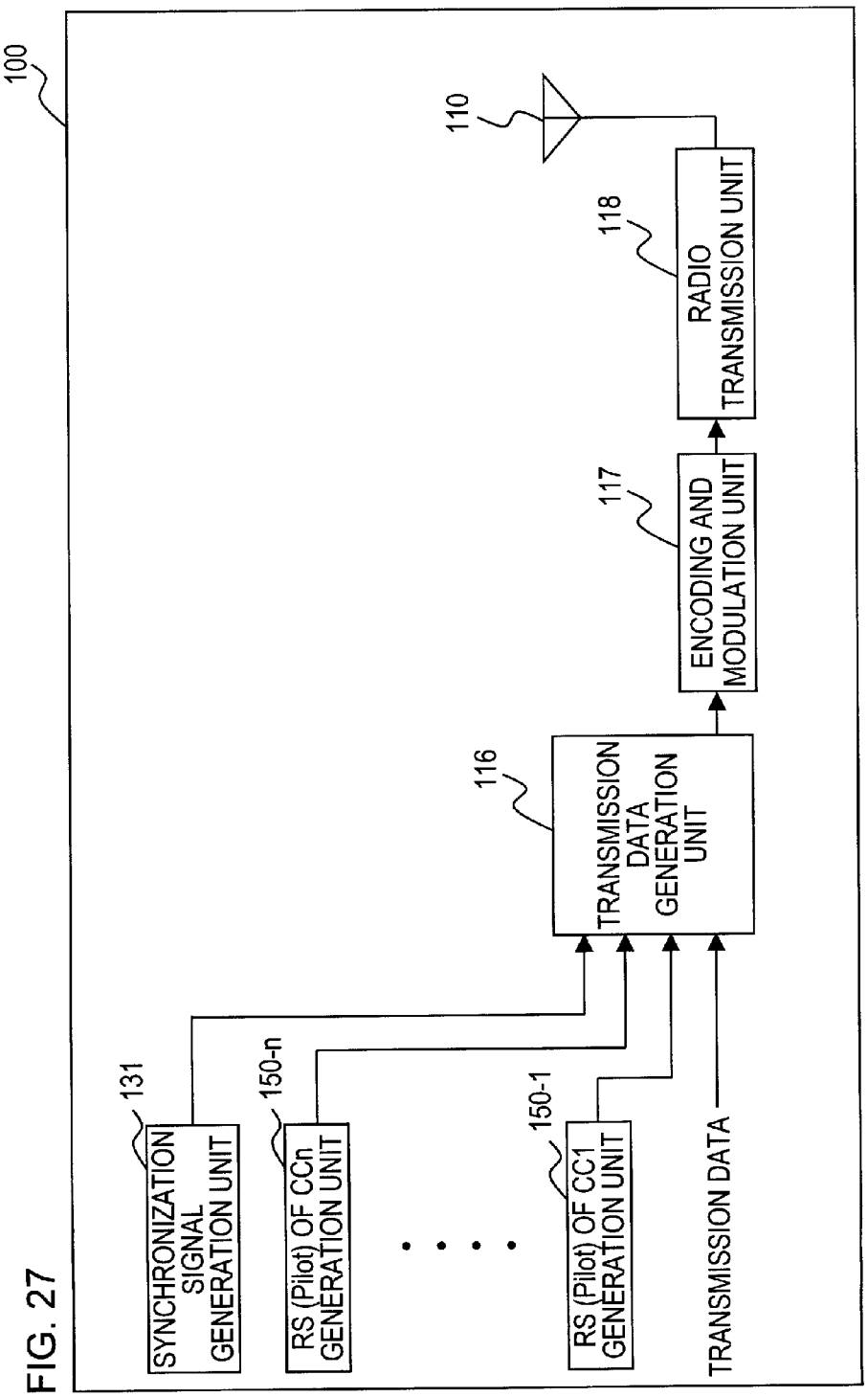
FIG. 27 illustrates a configuration example of a base station.
Figure 28:
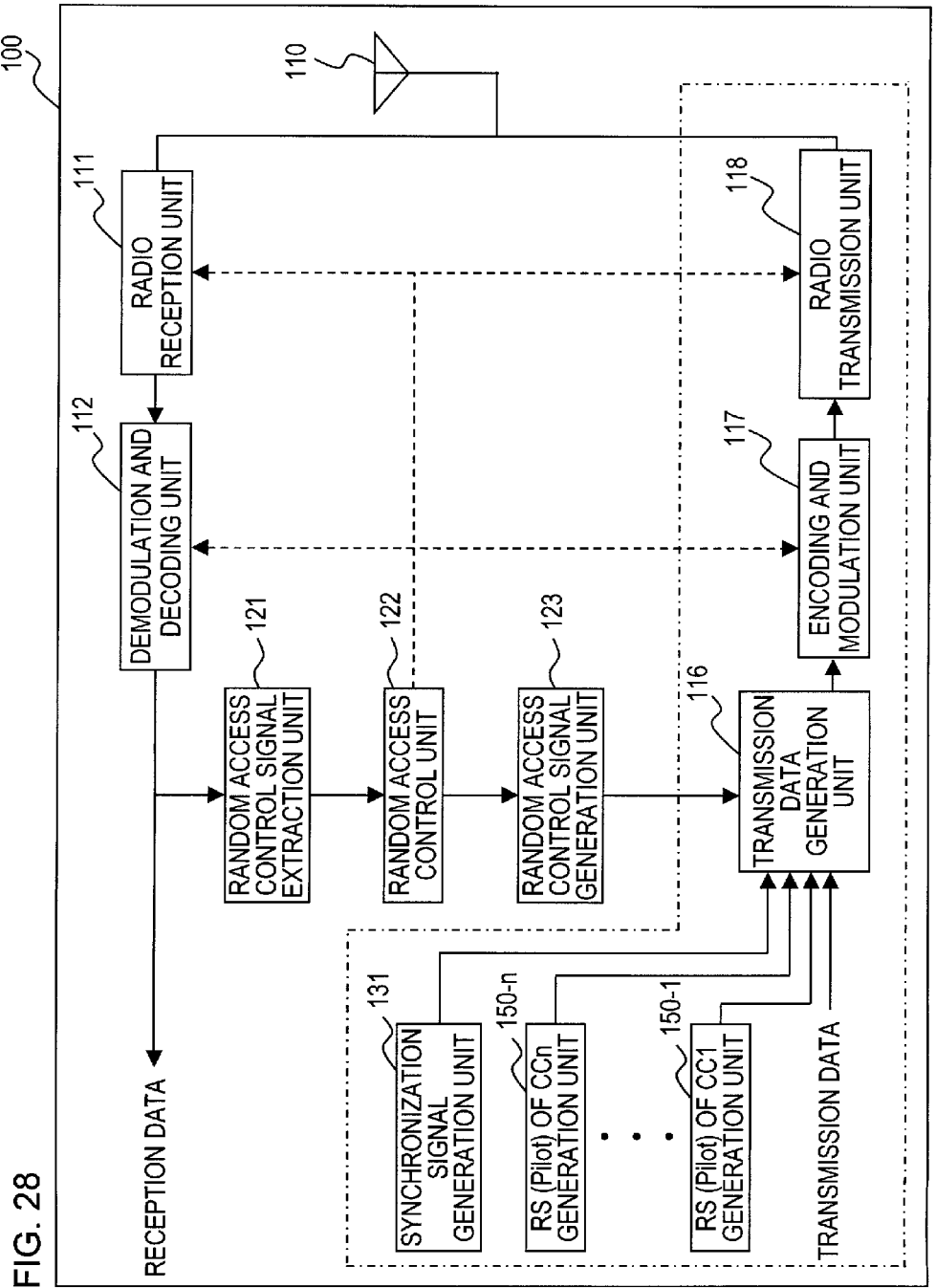
FIG. 28 illustrates a configuration example of a base station.
Figure 29:
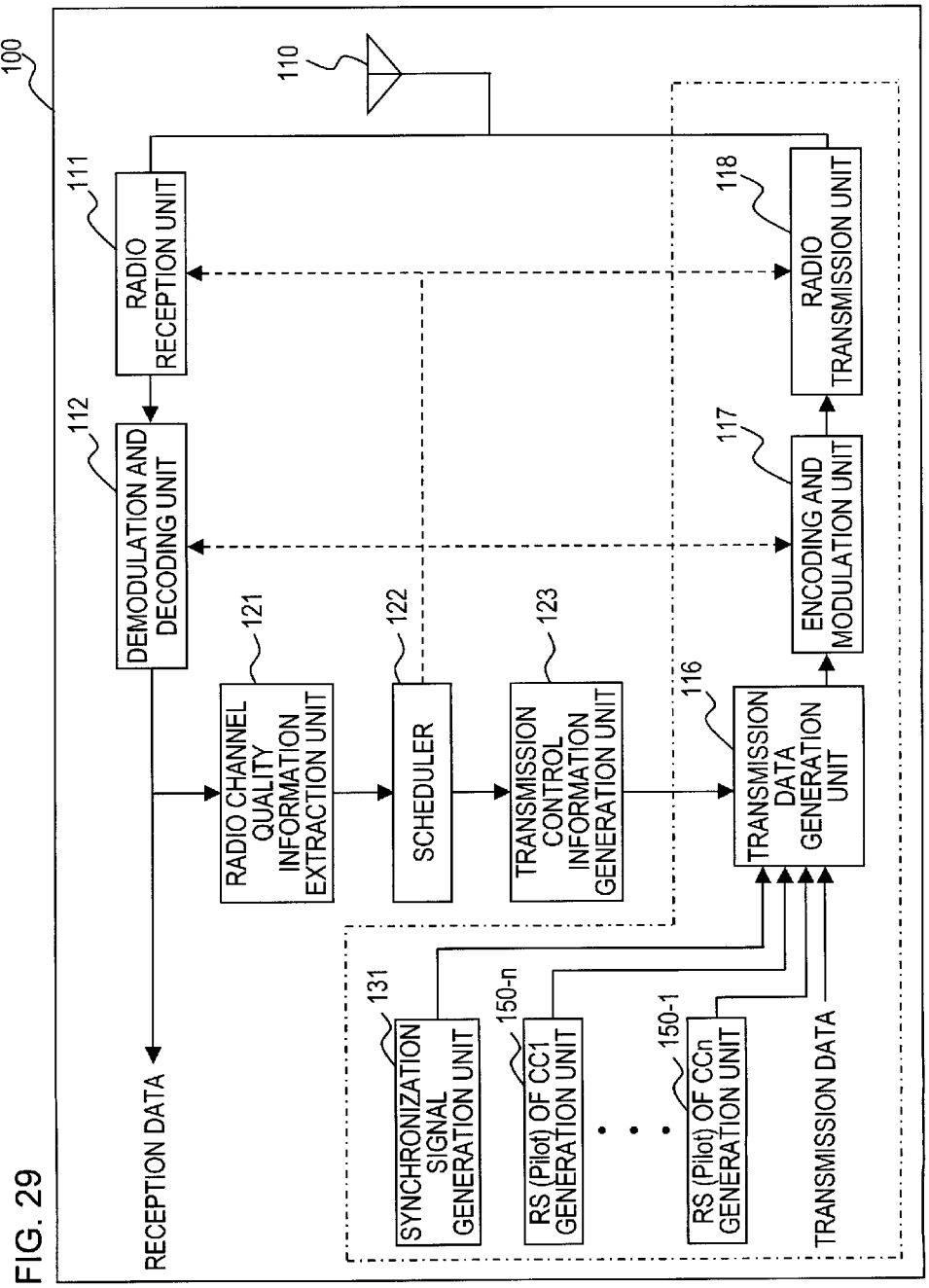
FIG. 29 illustrates a configuration example of a base station.
Figure 30:
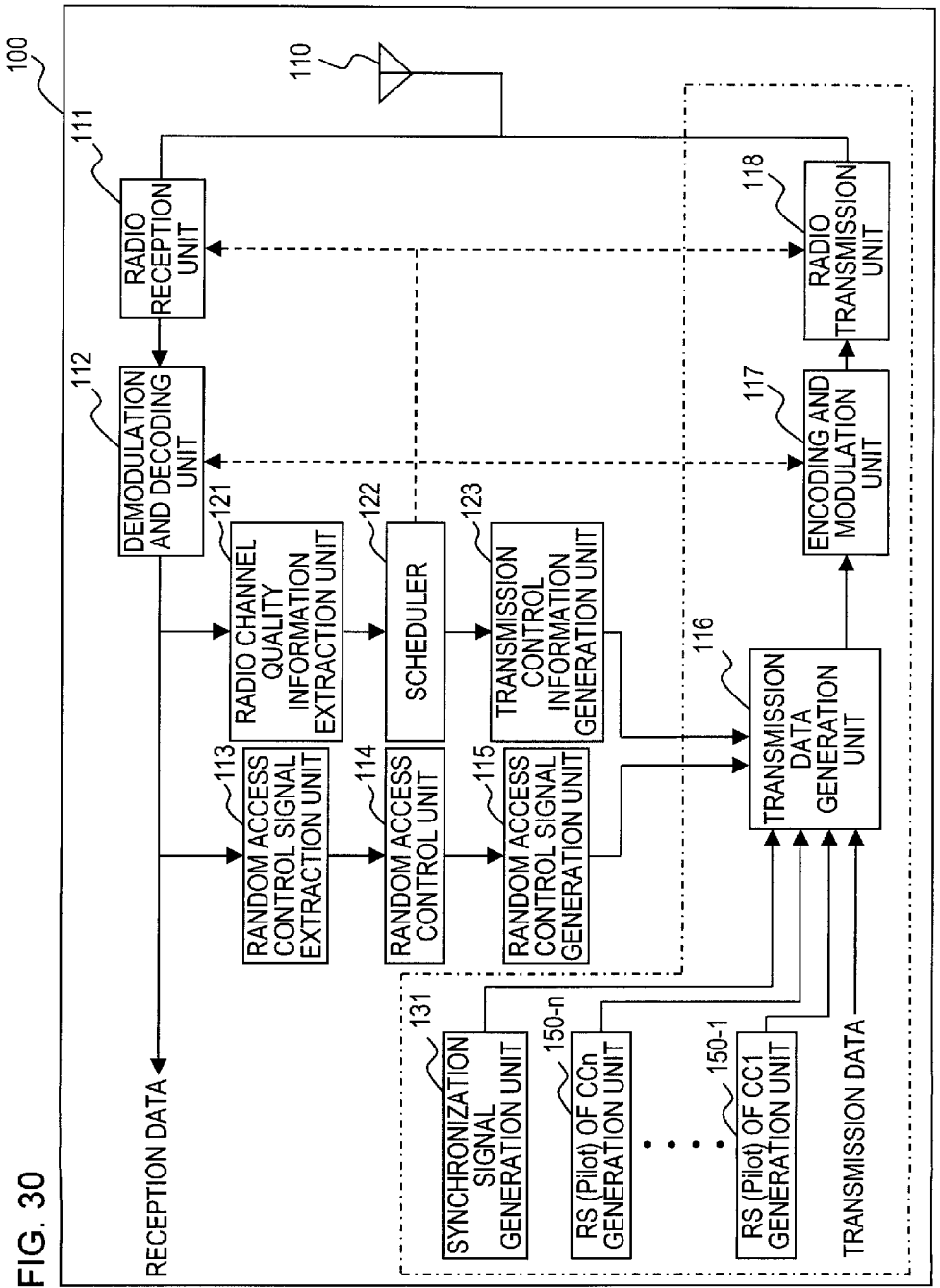
FIG. 30 illustrates a configuration example of a base station.
Figure 31:
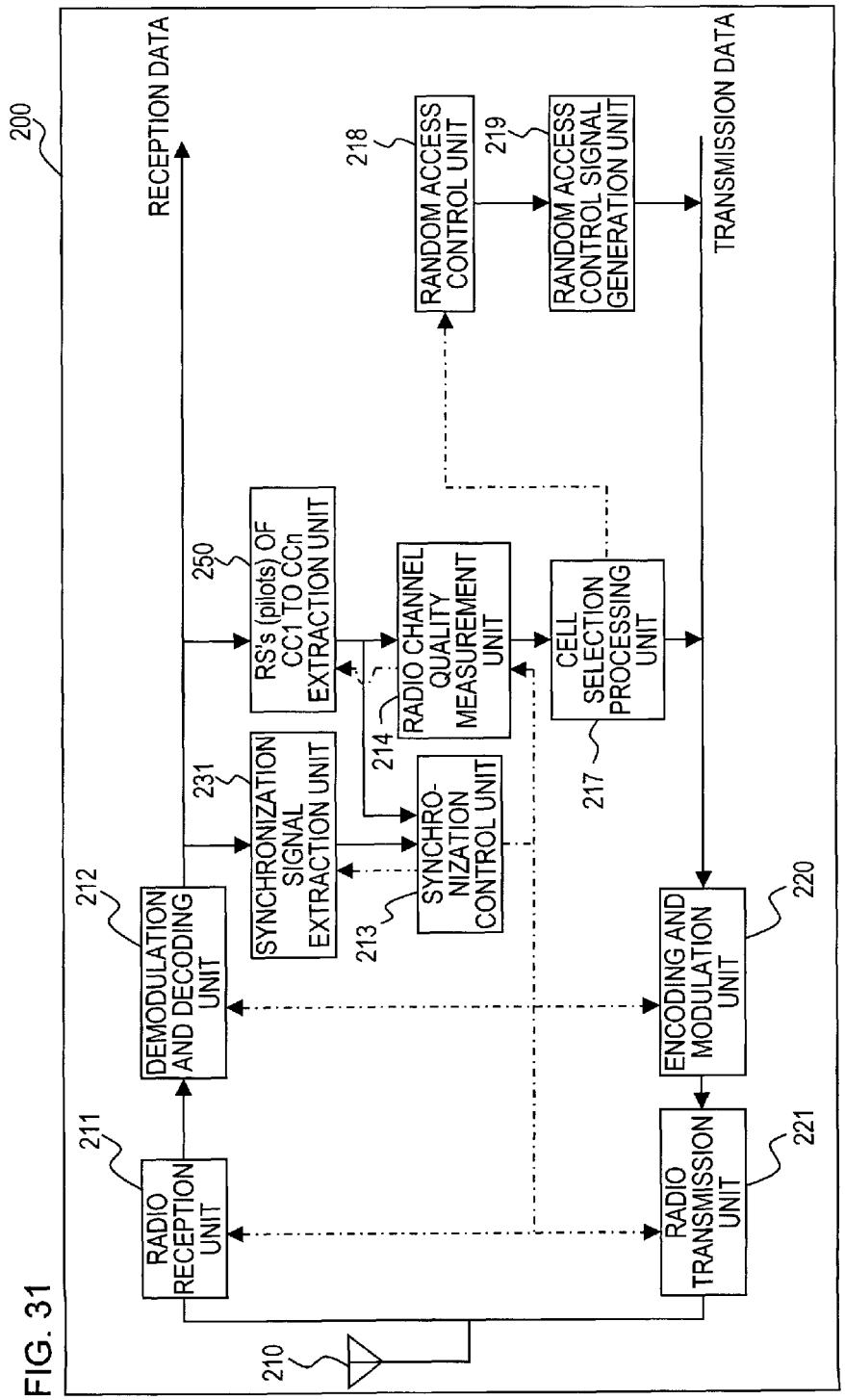
FIG. 31 illustrates a configuration example of a terminal.
Figure 32:
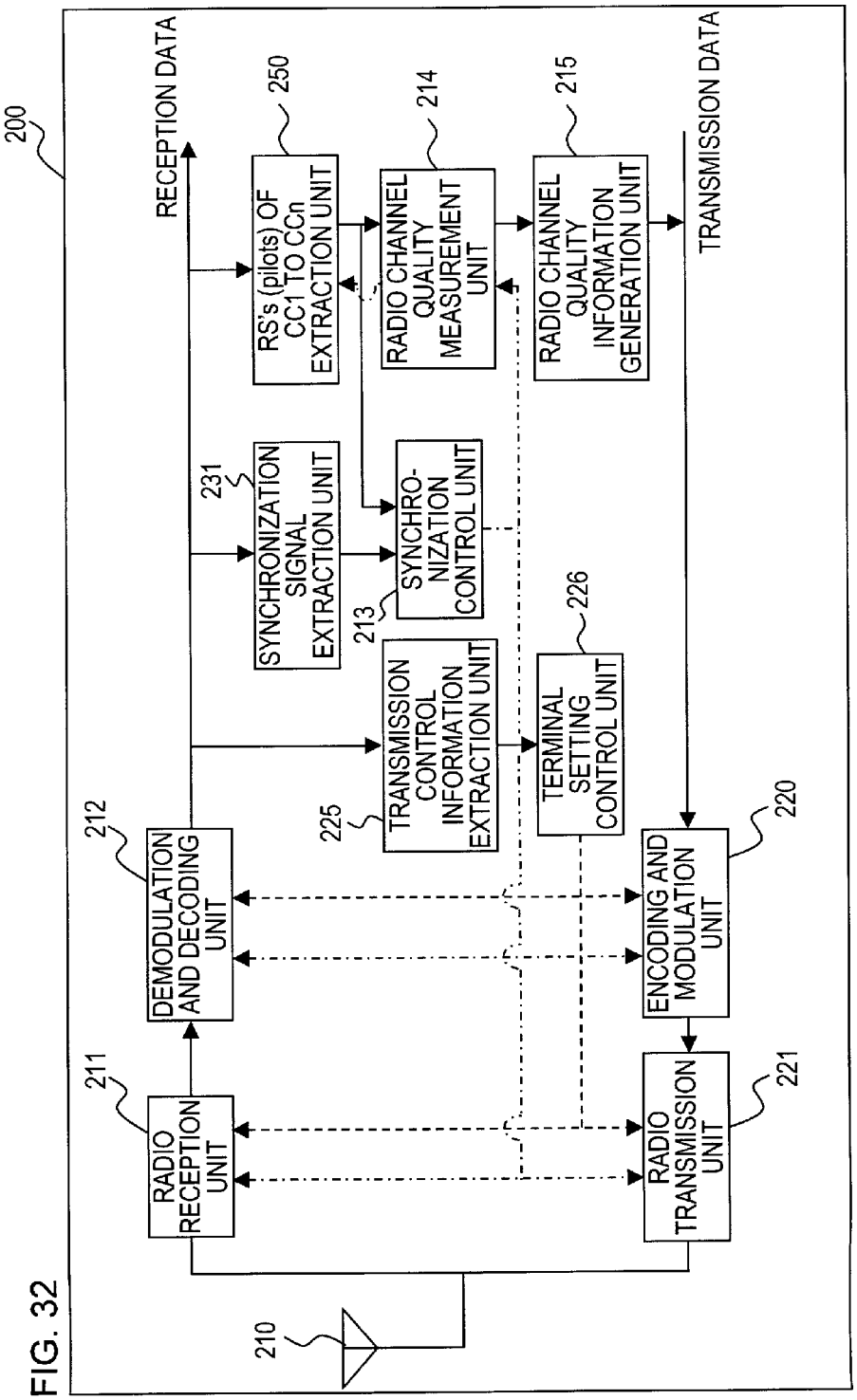
FIG. 32 illustrates a configuration example of a terminal.
Figure 33:
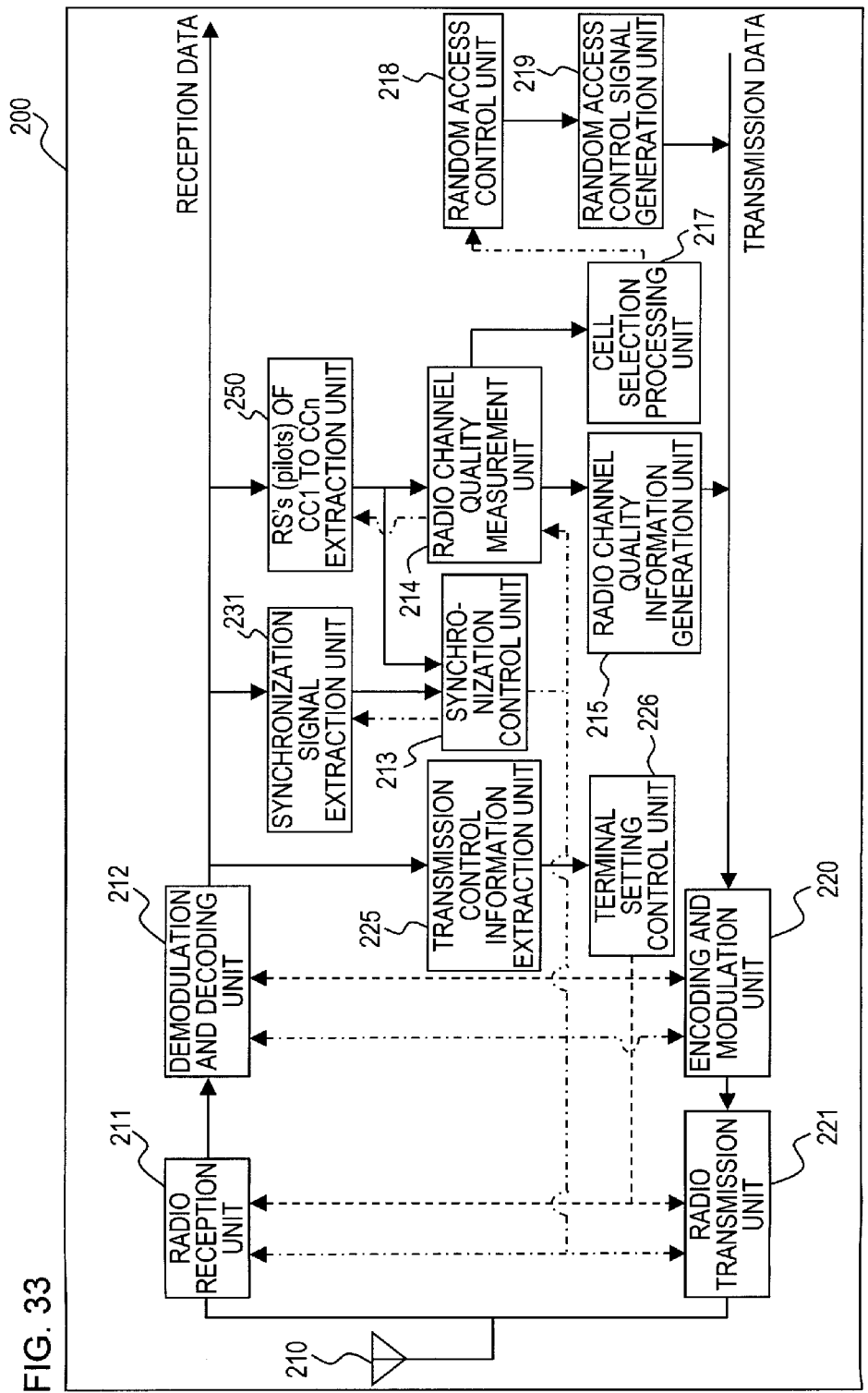
FIG. 33 illustrates a configuration example of a terminal.

FIG. 27 illustrates another configuration example of the transmission system of the base station 100. The base station 100 includes further a synchronization signal generation unit 131 and RS generation units 150-1 to 150-n for each CC. The base station 100 transmits the synchronization signal of one type and also the reference signal for each CC1 to CCn. FIG. 28, FIG. 29, and FIG. 30 illustrate configuration examples of the base station 100 relating to the cases where the cell search is performed, the band-variable operation is performed, and both the cell search and the band-variable operation can be implemented, respectively. FIG. 31, FIG. 32, and FIG. 33 illustrate configuration examples of the terminal 200 relating to the cases where the cell search is performed, the band-variable operation is performed, and both the cell search and the band-variable operation can be implemented, respectively. The terminal 200 includes further a synchronization signal extraction unit 231, extracts the synchronization signal with respect to the output from the demodulation and decoding unit 212, and outputs the extracted synchronization signal to the synchronization control unit 213. The synchronization control unit 213 selects, for example, at least one optimum reference signal from the reference signals of CC1 to CCn. The selection is performed in the same manner as in the above-described example. The synchronization control unit 213 can perform frequency synchronization and phase synchronization of the radio reception unit 211 and the like based on the synchronization signal and the selected reference signal. As mentioned above, for example, since the reference signal of CC1 and the synchronization signal of CC1 have the same frequency, the synchronization control unit 213 can perform frequency synchronization of the radio reception unit 211 or the like by selecting either of them. Further, the synchronization control unit 213 can also perform the synchronization by OFDM symbol timing by using the selected reference signal.

Figure 34:
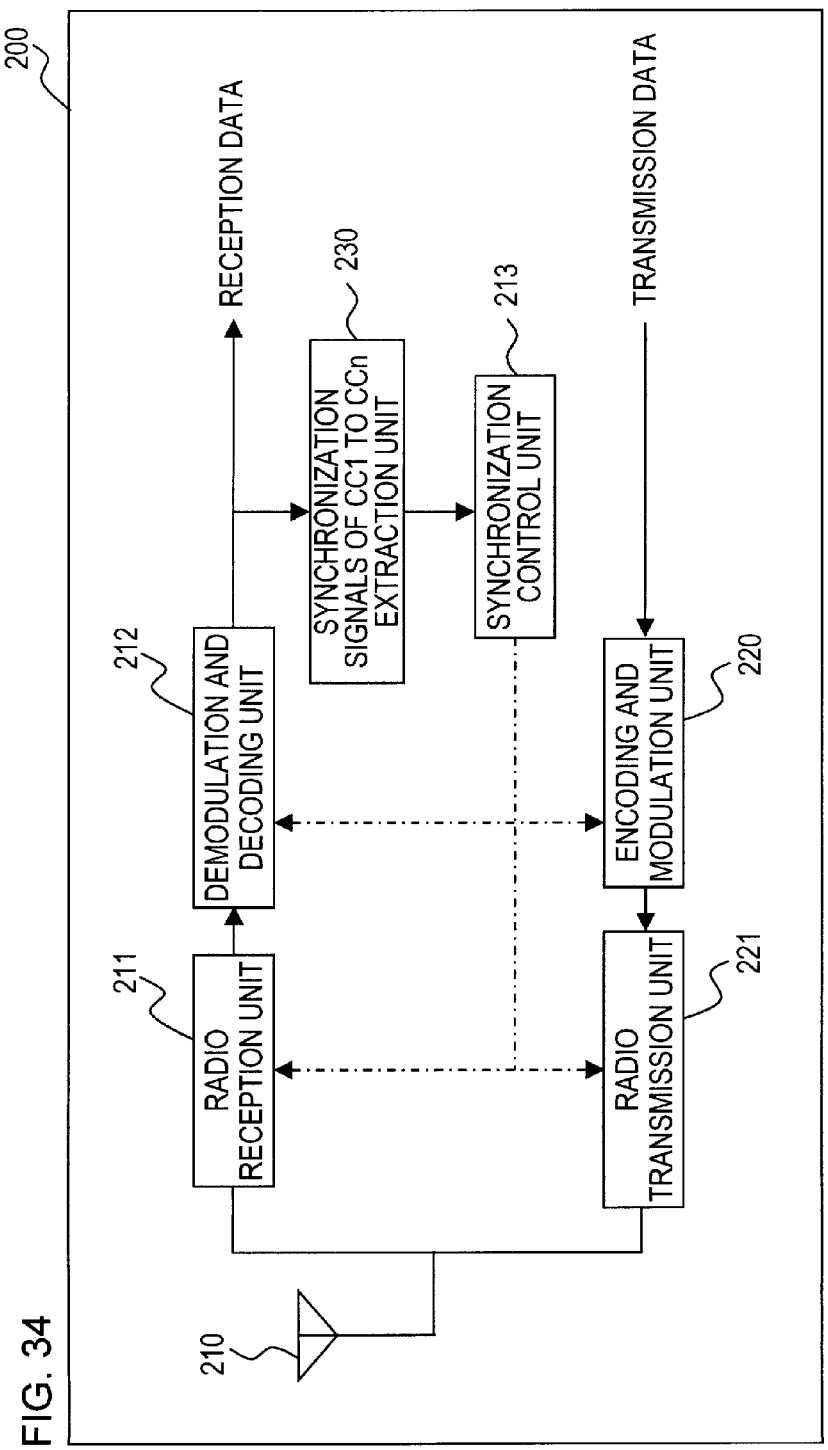
FIG. 34 illustrates a configuration example of a terminal.

FIG. 34 illustrates another configuration example of the terminal 200. The terminal 200 illustrated by FIG. 34 represents an example of configuration in which at least one optimum synchronization signal is selected from the synchronization signals of CC1 to CCn and the synchronization is performed based on this synchronization signal, without using the reference signal. The synchronization control unit 213 selects at least one optimum synchronization signal from the synchronization signals of CC1 to CCn in the same manner as in the above-described example. The selection is performed in the same manner as described above. The synchronization control unit 213 performs the control such as to synchronize the radio reception unit 211 with the frequency of the selected synchronization signal and the phase timing of the selected synchronization signal.

The radio communication system, the terminal apparatus, and the radio communication method in the radio communication system that prevent the degradation of frequency accuracy and phase accuracy can be provided.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

EXPLANATION OF REFERENCE NUMERALS

10: radio communication system
100: base station apparatus
111: radio reception unit
112: demodulation and decoding unit
113: random access control signal extraction unit
114: random access control unit
115: random access control signal generation unit
117: encoding and modulation unit
118: radio transmission unit
130: synchronization signals of CC1 to CCn generation unit
130-1 to 130-$n$: synchronization signal of CC1 generation unit to synchronization signal of CCn generation unit
131: synchronization signal generation unit
150: RSs of CC1 to CCn generation unit
150-1 to 150-$n$: RS of CC1 generation unit to RS of CCn generation unit
151: RS generation unit
200: terminal
211: radio reception unit
212: demodulation and decoding unit
213: synchronization control unit
214: radio channel quality measurement unit
215: radio channel quality information generation unit
217: cell selection processing unit
218: random access control unit
219: random access control signal generation unit
220: encoding and modulation unit
221: radio transmission unit
230: synchronization signals of CC1 to CCn extraction unit
231: synchronization signal extraction unit
250: RSs of CC1 to CCn extraction unit
251: RS extraction unit

What is claimed is:

1. A radio communication system, comprising:
a base station apparatus; and
a terminal apparatus, wherein
the base station apparatus and the terminal apparatus transmits to or receives from the terminal apparatus and the base station apparatus respectively a radio signal by using a first frequency band and a second frequency band as a transmission frequency or a reception frequency at a time,
the base station apparatus includes a transmission unit which transmits a plurality of first synchronization signals or a plurality of first reference signals by using the first frequency band, and a plurality of second synchronization signals or a plurality of second reference signals by using the second frequency band, and
the terminal apparatus includes a synchronization control unit which selects at least one synchronization signal out of the plurality of first synchronization signals and the plurality of second synchronization signals, or at least one reference signal out of the plurality of first reference signals and the plurality of second reference signals, transmitted from the base station apparatus by using the first and second frequency bands at a time and performs synchronization control based on the selected at least one synchronization signal or reference signal.

2. The radio communication system according to claim 1, wherein the synchronization control unit selects the synchronization signal or the reference signal with the lowest frequency out of the first and second synchronization signals or the first and second reference signals.

3. The radio communication system according to claim 1, wherein the synchronization control unit selects the synchronization signal or the reference signal with the highest frequency out of the first and second synchronization signals or the first and second reference signals.

4. The radio communication system according to claim 1, wherein the synchronization control unit selects the synchronization signal or the reference signal with a frequency which is the closest to a central frequency of an aggregated frequency bandwidth out of the first and second synchronization signals or the first and second reference signals.

5. The radio communication system according to claim 1, wherein the synchronization control unit selects the at least one synchronization signal and one reference signal, performs a first synchronization by using the selected synchronization signal, and then performs a second synchronization by using the selected at least one reference signal.

6. The radio communication system according to claim 1, wherein the terminal apparatus further includes a setting control unit which controls the terminal apparatus to transmit or receive the radio signal by using the first and second frequency bands as the transmission frequency or the reception frequency.

7. The radio communication system according to claim 1, wherein the synchronization signal or the reference signal is a synchronization signal or a reference signal which is different for each frequency in the first and second frequency bands respectively.

8. The radio communication system according to claim 1, wherein
the transmission unit transmits the first and second synchronization signals or the first and second reference signals for each of the first and second frequency bands included in a reduced frequency, when the transmission unit transmits or receives the radio signal by using the reduced first and second frequency bands, and
the synchronization control unit selects the at least one synchronization signal or the at least one reference signal out of the first and second synchronization signals or the first and second reference signals, and performs synchronization control.

9. The radio communication system according to claim 1, wherein the first frequency and the second frequency out of the first and second frequency bands belong to different frequency bands.

10. The radio communication system according to claim 1, wherein a third frequency and a fourth frequency out of the first and second frequency bands belong to same frequency bands.

11. The radio communication system according to claim 1, wherein
the terminal apparatus further includes a radio communication unit which transmits or receives the radio signal, and a setting control unit controls the radio communication unit to transmit or receive the radio signal by using an aggregated frequency as the transmission frequency or the reception frequency.

12. The radio communication system according to claim 7, wherein a signal sequence each of the first and second synchronization signals or the first and second reference signals is different for each frequency band in the first and second frequency bands.

13. The radio communication system according to claim 7, wherein a frequency of the reference signal or the synchronization signal matches a central frequency of each frequency in the first and second frequency bands.

14. The radio communication system according to claim 5, wherein the first synchronization is slot timing phase synchronization, and the second synchronization is symbol timing phase synchronization.

15. The radio communication system according to claim 5, wherein the first synchronization is frequency synchronization and the second synchronization is phase synchronization.

16. A terminal apparatus for transmitting to or receiving from a base station apparatus a radio signal by using a first frequency band and a second frequency band as a transmission frequency or a reception frequency at a time, the terminal apparatus comprising:
- a reception unit which receives a plurality of first synchronization signals or a plurality of first reference signals transmitted from the base station apparatus by using the first frequency band, and a plurality of second synchronization signals or a plurality of second reference signals transmitted from the base station apparatus by using the second frequency band; and
- a synchronization control unit which selects at least one synchronization signal out of the plurality of first synchronization signals and the plurality of second synchronization signals or at least one reference signal out of the plurality of first reference signals and the plurality of second reference signals by using the first and second frequency bands at a time and performs synchronization control based on the selected synchronization signal or reference signal.

17. A radio communication method in a radio communication system for transmitting or receiving between a base station apparatus and a terminal apparatus a radio signal by using a first frequency band and a second frequency band as a transmission frequency or a reception frequency at a time, the method comprising:
- transmitting a plurality of first synchronization signals or a plurality of first reference signals by using the first frequency band, and a plurality of second synchronization signals or a plurality of second reference signals by using the second frequency band, by the base station apparatus; and
- selecting at least one synchronization signal out of the plurality of first synchronization signals and the plurality of second synchronization signals, or at least one reference signal out of the plurality of first reference signals and the plurality of second reference signals, transmitted from the base station apparatus by using the first and second frequency bands at a time, and performing synchronization control based on the selected at least one synchronization signal or reference signal.

18. A base station apparatus comprising:
a transmission unit which transmits a plurality of transmission data signals and a plurality of synchronization signals or a plurality of reference signals by using each frequency band in a plurality of frequency bands at a time; and
a reception unit which receives a plurality of transmission data signals transmitted by a terminal apparatus by using each frequency band in a plurality of frequency bands at a time.

* * * * *